(12) United States Patent
Momose

(10) Patent No.: US 12,002,427 B2
(45) Date of Patent: Jun. 4, 2024

(54) PROJECTION DEVICE AND METHOD FOR CONTROLLING PROJECTION DEVICE

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/153,819

(22) Filed: Jan. 12, 2023

(65) Prior Publication Data
US 2023/0222977 A1 Jul. 13, 2023

(30) Foreign Application Priority Data
Jan. 13, 2022 (JP) ................. 2022-003541

(51) Int. Cl.
G09G 3/3233 (2016.01)
G09G 3/00 (2006.01)

(52) U.S. Cl.
CPC .......... *G09G 3/3233* (2013.01); *G09G 3/002* (2013.01); *G09G 2300/0814* (2013.01); *G09G 2300/0852* (2013.01); *G09G 2300/0871* (2013.01); *G09G 2310/08* (2013.01); *G09G 2320/0233* (2013.01); *G09G 2340/0407* (2013.01)

(58) Field of Classification Search
CPC .......... G09G 3/002–003; G09G 3/007; G09G 3/32–3291; G09G 2300/0842–0871
See application file for complete search history.

(56) References Cited

U.S. PATENT DOCUMENTS

| | | | | |
|---|---|---|---|---|
| 10,991,286 | B2* | 4/2021 | Hosaka | G09G 3/007 |
| 11,749,183 | B2* | 9/2023 | Momose | G09G 3/32 |
| | | | | 345/204 |
| 11,749,199 | B1* | 9/2023 | Pu | G09G 3/3233 |
| | | | | 345/204 |
| 2005/0025388 | A1 | 2/2005 | Damera-Venkata et al. | |
| 2012/0293479 | A1* | 11/2012 | Han | H04N 13/341 |
| | | | | 345/212 |
| 2012/0299883 | A1* | 11/2012 | Sumida | H10K 50/858 |
| | | | | 345/204 |
| 2015/0138253 | A1 | 5/2015 | Kimura et al. | |
| 2020/0098295 | A1* | 3/2020 | Hosaka | G09G 3/2022 |

(Continued)

FOREIGN PATENT DOCUMENTS

| | | |
|---|---|---|
| JP | 2007-500868 A | 1/2007 |
| JP | 2011-158589 A | 8/2011 |
| JP | 2017-203991 A | 11/2017 |

*Primary Examiner* — Patrick F Marinelli
(74) *Attorney, Agent, or Firm* — Oliff PLC

(57) ABSTRACT

In a pixel circuit including a first capacitance element and a second capacitance element, in a writing sub-frame, a voltage corresponding to a gray scale level is held in a first capacitance element, a plurality of OLEDs are off in a vertical scanning line flyback period after the writing sub-frame, and in a light-emitting sub-frame after the vertical scanning line flyback period, a current corresponding to the voltage held in the first capacitance element is supplied to the OLED, and the voltage corresponding to the gray scale level is held in the second capacitance element. In an optical path shifting element, an optical path is shifted in the vertical scanning line flyback period, and in the light-emitting sub-frame, the optical path is stabilized.

9 Claims, 18 Drawing Sheets

(56) References Cited

U.S. PATENT DOCUMENTS

| | | | |
|---|---|---|---|
| 2020/0327835 A1* | 10/2020 | Kawashima | H01L 29/7869 |
| 2022/0383785 A1* | 12/2022 | Hosaka | G09G 3/3614 |
| 2023/0091789 A1* | 3/2023 | Momose | G09G 3/3233 |
| | | | 345/204 |
| 2023/0222977 A1* | 7/2023 | Momose | G09G 3/3233 |
| | | | 345/55 |

* cited by examiner

FIG. 7

PROJECTION DEVICE AND METHOD FOR CONTROLLING PROJECTION DEVICE

The present application is based on, and claims priority from JP Application Serial Number 2022-003541, filed Jan. 13, 2022, the disclosure of which is hereby incorporated by reference herein in its entirety.

BACKGROUND

1. Technical Field

The present disclosure relates to a projection device and a method for controlling a projection device.

2. Related Art

For a projection device that expands an image displayed on a display panel, and projects the image onto a screen, or the like, a technique for shifting an optical path of light emitted from the display panel by an optical path shifting element has been known (see, for example, JP 2007-500868 A, JP 2011-158589 A). With this technique, an image for which resolution of the display panel is improved in a pseudo manner can be caused to be visually recognized by a user.

For the display panel, line sequential driving is a mainstream, and display contents are switched each time scanning lines are written.

On the other hand, according to the shifting of the optical path by the optical path shifting element, the entire image is shifted. Therefore, for example, when the optical path is shifted while writing is performed near a center of the screen, an upper half of the screen is in a state after the switching of the display contents, but a lower half of the screen is in a state before the switching of the display contents, and thus the image before switching and the image after switching are mixed and visually recognized.

In addition, in a configuration in which an optical path is shifted after completion of horizontal scanning, writing of all scanning lines needs to be completed in a short period of time in order to ensure a period in which an image after switching is caused to be visually recognized, which incurs insufficient writing.

SUMMARY

A projection device according to an aspect of the present disclosure includes a display panel including a plurality of pixel circuits, and an optical path shifting element, wherein each of the plurality of pixel circuits includes a first capacitance element and a second capacitance element, and a light-emitting element that emits light, having luminance corresponding to a current, in a predetermined direction, the optical path shifting element is capable of shifting an optical path of light emitted from the light-emitting element to a first optical path and a second optical path, in the plurality of pixel circuits, in a first period, a voltage corresponding to a current supplied to the light-emitting element is held in the first capacitance element, in a light-out period after the first period, the light-emitting element is off, in a second period after the light-out period, a current corresponding to the voltage held in the first capacitance element is supplied to the light-emitting element, and a voltage corresponding to the current supplied to the light-emitting element is held in the second capacitance element, and in the optical path shifting element, shifting is performed from the first optical path to the second optical path in the light-out period, and the second optical path is maintained in the second period.

BRIEF DESCRIPTION OF THE DRAWINGS

FIG. 7 is a diagram illustrating a relationship between each sub-frame and optical path shifting.

FIG. 12 is a timing chart illustrating operation of the display panel, and the like.

FIG. 13 is a timing chart illustrating operation of the display panel, and the like.

FIG. 18 is a timing chart illustrating operation of the display panel, and the like.

FIG. 19 is a timing chart illustrating operation of the display panel, and the like.

DESCRIPTION OF EXEMPLARY EMBODIMENTS

A display panel according to exemplary embodiments of the present disclosure will be described below with reference to the accompanying figures.

In each of the figures, dimensions and scale of each part are appropriately different from actual ones. Moreover, the exemplary embodiment described below is a suitable specific example, and various technically preferable limitations are applied, but the scope of the disclosure is not limited to these modes unless they are specifically described in the following description as limiting the disclosure.

First Exemplary Embodiment

Figure 1:
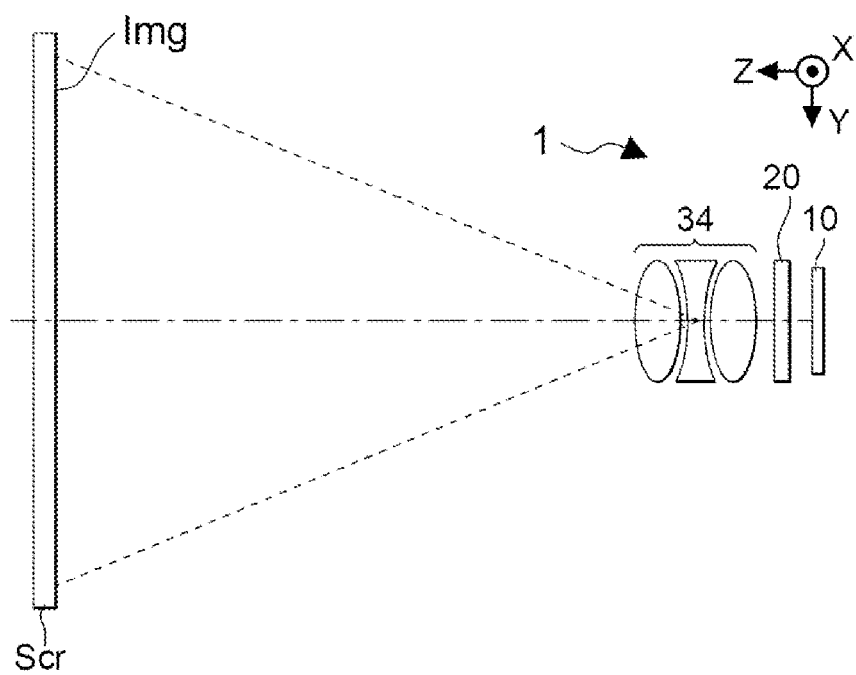
FIG. 1 is a diagram illustrating a configuration of a projection device according to a first exemplary embodiment.
Figure 2:
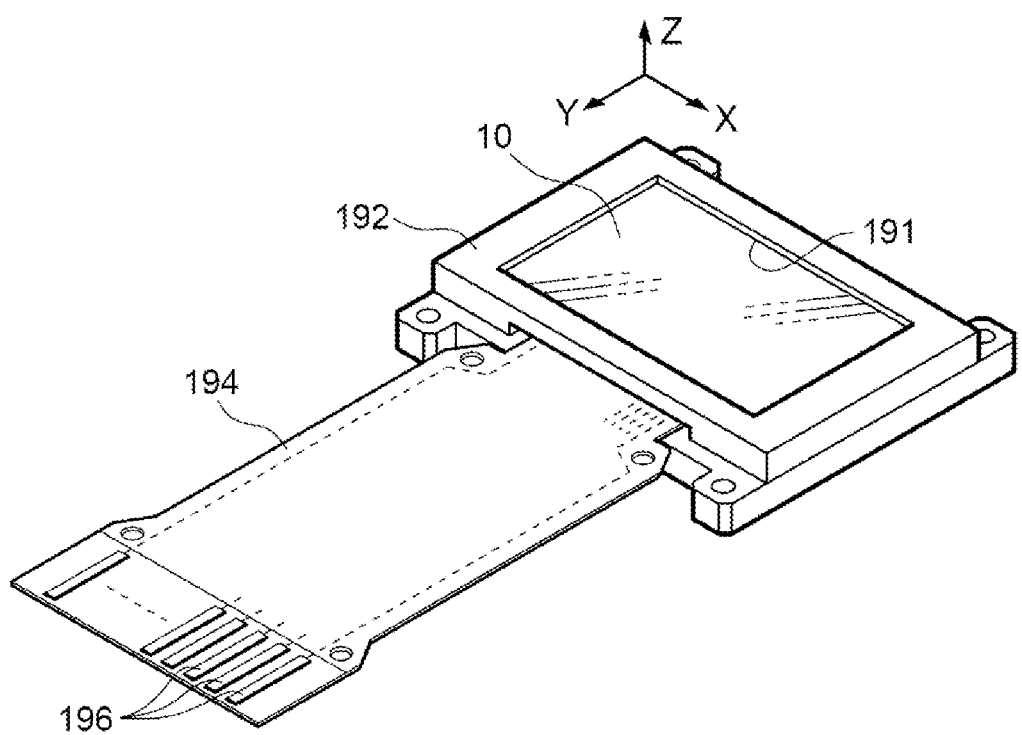
FIG. 2 is a perspective view illustrating a configuration of a display panel applied to the projection device.

FIG. 1 is a diagram illustrating a configuration of a projection device 1 according to a first exemplary embodiment, and FIG. 2 is a perspective view illustrating a configuration of a display panel 10 applied to the projection device 1. The projection device 1 expands a color image created by the display panel 10, and projects the color image onto a screen Scr. The display panel 10 includes a light-emitting element, and the projection device 1 does not require a separate light source, and can be miniaturized. Furthermore, the projection device 1 can display a high resolution color image by an optical path shifting element 20.

The display panel 10 is a micro display that creates a color image. In the present exemplary embodiment, a display panel of a single plate with an OLED applied to the light-emitting element is used as the display panel 10. OLED is an abbreviation for Organic Light Emitting Diode.

In the display panel 10, a plurality of pixel circuits, a driving circuit for driving the pixel circuits, and the like are formed at a semiconductor substrate. The semiconductor substrate is typically a silicon substrate, but may be a different semiconductor substrate.

As illustrated in FIG. 1, light emitted from the display panel 10 is incident on the optical path shifting element 20. A projection lens 34 expands a projection image Img through the optical path shifting element 20, and projects the projection image Img onto the screen Scr.

The optical path shifting element 20 shifts the light emitted from the display panel 10. Specifically, the optical path shifting element 20 can shift the projection image Img onto the screen Scr in accordance with control described later in a left-right direction and an up-down direction, when the screen Scr, which is a projection surface, is viewed.

For convenience of explanation, it is necessary to distinguish pixels of the projection image Img onto the screen Scr and pixels by the display panel 10. Therefore, in the present description, the pixels of the projection image Img onto the screen Scr are referred to as projection pixels, and the pixels displayed by the display panel 10 are referred to as panel pixels.

As illustrated in FIG. 2, the display panel 10 is housed in a frame-shaped case 192 including an opening 191. One end of an FPC substrate 194 is coupled to the display panel 10. Note that, FPC is an abbreviation for Flexible Printed circuits. A plurality of terminals 196 are provided at another end of the FPC substrate 194. The plurality of terminals 196 are connected to a video processing circuit which will be described next.

Note that, in the figure, an X direction is an extension direction of a scanning line in the display panel 10, and indicates a horizontal direction of display pixels, and a Y direction is an extension direction of a data line, and indicates a vertical direction of the display pixels. Further, a two-dimensional plane defined by the X direction and the Y direction is a substrate surface of the semiconductor substrate. A Z direction is perpendicular to the X direction and the Y direction, and indicates an emission direction of light emitted from the OLED.

Figure 3:
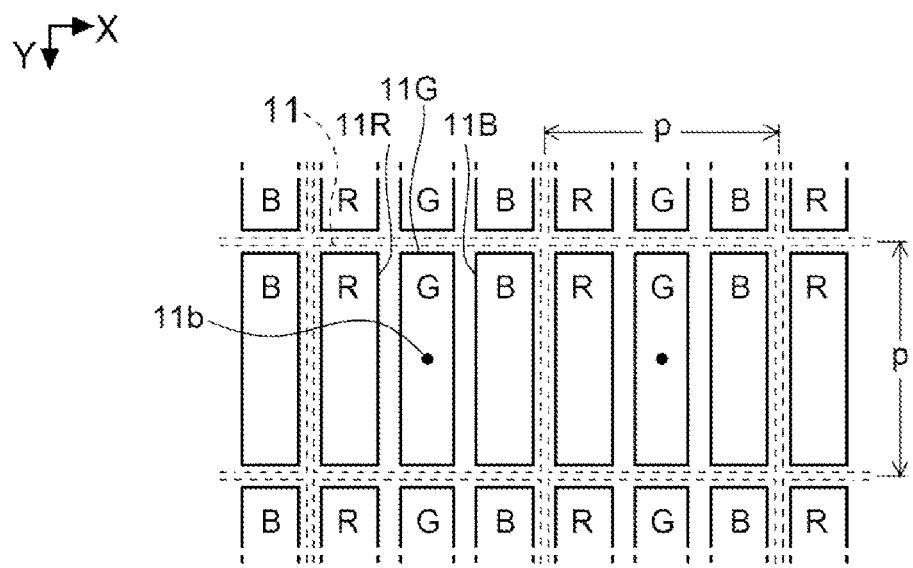
FIG. 3 is an example illustrating panel pixels and sub-panel pixels in the projection device.

FIG. 3 is a diagram illustrating a configuration of a panel pixel 11 in the display panel 10. One panel pixel 11 as illustrated in this figure includes a red sub-panel pixel 11R, a green sub-panel pixel 11G, and a blue sub-panel pixel 11B.

Note that, in the display panel 10, the panel pixels 11 each have a substantially square shape in plan view, and are arrayed at pitches p in each of the X direction (horizontal direction) and the Y direction (vertical direction). Also, a reference numeral 11b denotes a centroid of the panel pixel 11.

Further, although details will be described later, the panel pixels 11 in the display panel 10 are arrayed in a matrix of vertical m rows by horizontal columns. Both m and n are integers equal to or greater than 2.

Figure 4:
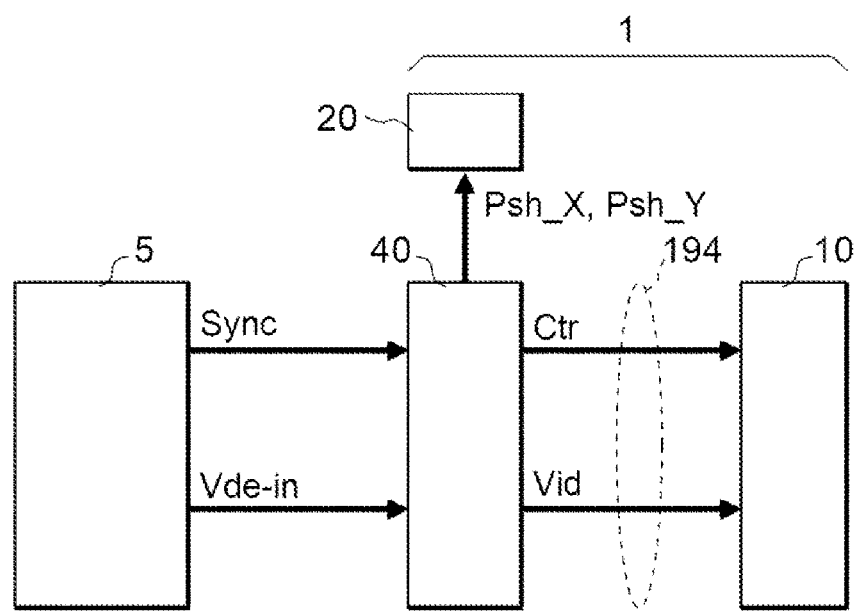
FIG. 4 is a block diagram illustrating an electrical configuration of the projection device.

FIG. 4 is a block diagram illustrating an electrical configuration of the projection device 1. As illustrated in the figure, the projection device 1 includes, in addition to the display panel 10 and optical path shifting element 20 described above, a video processing circuit 40.

The video processing circuit 40 is supplied with video data Vde-in from a host device 5 in synchronization with a synchronizing signal Sync. The video data Vde-in is data expressing video to be displayed by the projection device 1, and in particular, specifies a gray scale level of a color image in one frame of the video with eight bits for each of red (R), green (G), and blue (B), for example. For convenience of explanation, pixels of the color image expressed by the video data Vde-in are denoted as input pixels.

The synchronization signal Sync includes a vertical synchronization signal that instructs a start of vertical scanning in the video data Vid-in, a horizontal synchronization signal that instructs a start of horizontal scanning, and a clock signal that indicates timing for one pixel of the video data Vid-in.

In the present exemplary embodiment, an array of the display pixels specified by the video data Vde-in is doubled in the vertical direction, and is doubled in the horizontal direction, as compared to the array of the panel pixels in the display panel 10, for example. Specifically, in particular, the input pixels are arrayed in vertical (2m) rows by horizontal (2n) columns.

In the present exemplary embodiment, four input pixels specified by the video data Vde-in are represented by one panel pixel in the display panel 10. Thus, first, a specific technique therefor will be described.

In the present exemplary embodiment, in order for a projection image to be visually recognized with resolution higher than resolution of the panel pixel, a path of light emitted from the display panel 10 (a position of a projection pixel) is shifted by the optical path shifting element 20. Specifically, when an image of one frame is displayed by the video data Vde-in, a period for displaying the one frame is divided into four sub-frames, and the position of the projection pixel is shifted for each sub-frame. By such shifting, one panel pixel is visually recognized as if four input pixels are displayed in one frame (four sub-frames).

Figure 5:
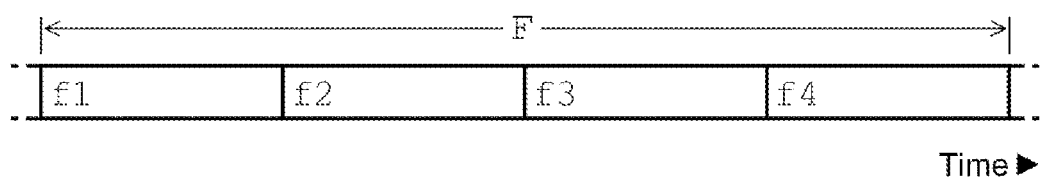
FIG. 5 is a diagram illustrating a configuration of a frame in the projection device.

FIG. 5 is a diagram for explaining a relationship between the frame and the sub-frames in the present exemplary embodiment. As illustrated in this figure, in the present exemplary embodiment, one frame F is divided into four sub-frames, and f1, f2, f3, and f4 are given to the four sub-frames as reference numerals, respectively, in order of time.

Note that, a period length of the frame F is, when a frequency of a vertical synchronization signal included in the synchronization signal Sync is 60 Hz, 16.7 milliseconds which corresponds to one cycle. In this case, a period length of each of the sub-frames f1 to f4 is 4.17 milliseconds.

A relationship among an input pixel for which a gray scale level is specified by the video data Vde-in, a panel pixel by the display panel 10, and a position of a projection pixel that is shifted by the optical path shifting element 20 will be described. Note that, as described above, the optical path shifting element 20 shifts the projection image Img onto the screen Scr in the left-right direction and the up-down direction, but for convenience, an amount of the shifting is converted to a size of the projection pixels or the panel pixels on the screen Scr for explanation.

Figure 6:
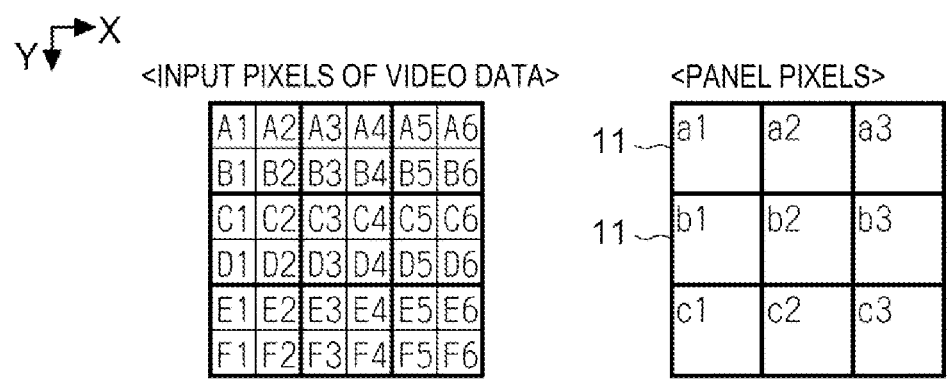
FIG. 6 is a diagram illustrating a correspondence relationship between input pixels and panel pixels.

A left section in FIG. 6 is a diagram in which only a part of video expressed by the video data Vde-in is extracted for illustration. Additionally, a right section in FIG. 6 is a diagram in which, of panel pixels, an array corresponding to an array of the input pixels in the left section is extracted for illustration.

In the array of the input pixels of the video data Vde-in in FIG. 6, for convenience, as reference numerals, A1 to A6 are given to a first row, B1 to B6 are given to a second row, C1 to C6 are given to a third row, D1 to D6 are given to a fourth row, E1 to E6 are given to a fifth row, and F1 to F6 are given to a sixth row.

In the array of the panel pixels 11 in FIG. 6, for convenience, as reference numerals, a1 to a3 are given to a first row, b1 to b3 are given to a second row, and c1 to c3 are given to a third row.

FIG. 6 illustrates that two by two, that is, a total of four input pixels indicated by a bold frame, of the array of the input pixels expressed by the video data Vde-in, are represented by one panel pixel 11.

Figure 7:
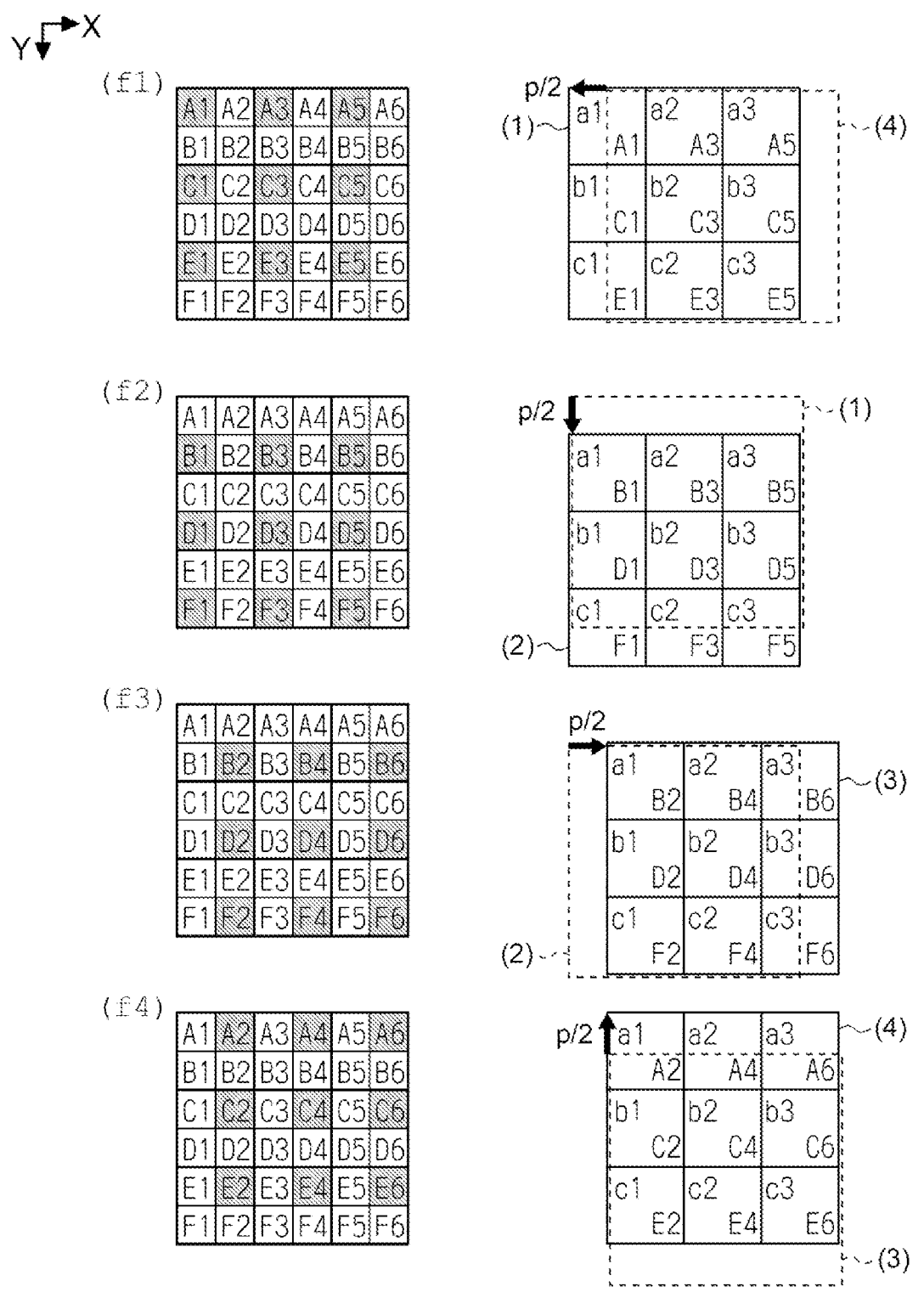

FIG. 7 is a diagram illustrating, in the projection device 1, which input pixel expressed by the video data Vde-in is shifted and displayed at which position of the panel pixel 11 of the display panel 10.

In detail, FIG. 7 is a diagram illustrating that, for the nine panel pixels 11 in the right section of FIG. 6, which input pixel of the input pixels in the left section of FIG. 6 is shifted and displayed at which position in each of the sub-frames f1 to f4. The optical path shifting element 20 is controlled to shift an optical path to first to fourth optical paths in the sub-frames f1 to f4. FIG. 7 illustrates that the optical path is shifted to each of the first to fourth optical paths, and an image is projected onto each of a position (1) to a position (4).

A first stage in FIG. 7 illustrates that in the sub-frame f1, the panel pixel 11 represents, at the position (1), of the two by two input pixels corresponding to the panel pixel 11, a hatched input pixel in an odd-numbered row and an odd-numbered column. For example, the panel pixel 11 at the position a1 represents the input pixel A1 by being projected at the position (1) on the screen Scr. The optical path is the first optical path. Note that, "the panel pixel 11 represents the input pixel A1" means that the OLEDs of each of RGB included in the panel pixel 11 emits light at luminance corresponding to a gray scale level of the input pixel A1 specified by the video data Vde-in.

A second stage in FIG. 7 illustrates that in the sub-frame f2, the panel pixel 11 represents, at the position (2), of the two by two input pixels corresponding to the panel pixel 11, a hatched input pixel in an even-numbered row and the odd-numbered column. For example, the panel pixel 11 at the position a1 represents the input pixel B1 by being projected at the position (2) on the screen Scr. The position (2) is a position where the position (1) is shifted in the Y direction by half the pitch p (p/2). The optical path is the second optical path.

A third stage in FIG. 7 illustrates that in the sub-frame f3, the panel pixel 11 represents, at the position (3), of the two by two input pixels corresponding to the panel pixel 11, a hatched input pixel in the even-numbered row and an even-numbered column. For example, the panel pixel 11 at the position a1 represents the input pixel B2 by being projected at the position (3) on the screen Scr. The position (3) is a position where the position (2) is shifted in the X direction by half the pitch p (p/2). The optical path is the third optical path.

A fourth stage in FIG. 7 illustrates that in the sub-frame f4, the panel pixel 11 represents, at the position (4), of the two by two input pixels corresponding to the panel pixel 11, a hatched input pixel in the odd-numbered row and the even-numbered column. For example, the panel pixel 11 at the position a1 represents the input pixel A2 by being projected at the position (4) on the screen Scr. The position (4) is a position where the position (3) is shifted in the Y direction by half the pitch p (p/2). The optical path is the fourth optical path.

Note that, when transitioning from the sub-frame f4 to the next sub-frame f1, a projection pixel is shifted from the position (4) in an opposite direction in the X direction by half the pitch p, and returns to the position (1). The optical path is returned to the first optical path by the optical path shifting element 20.

Figure 8:
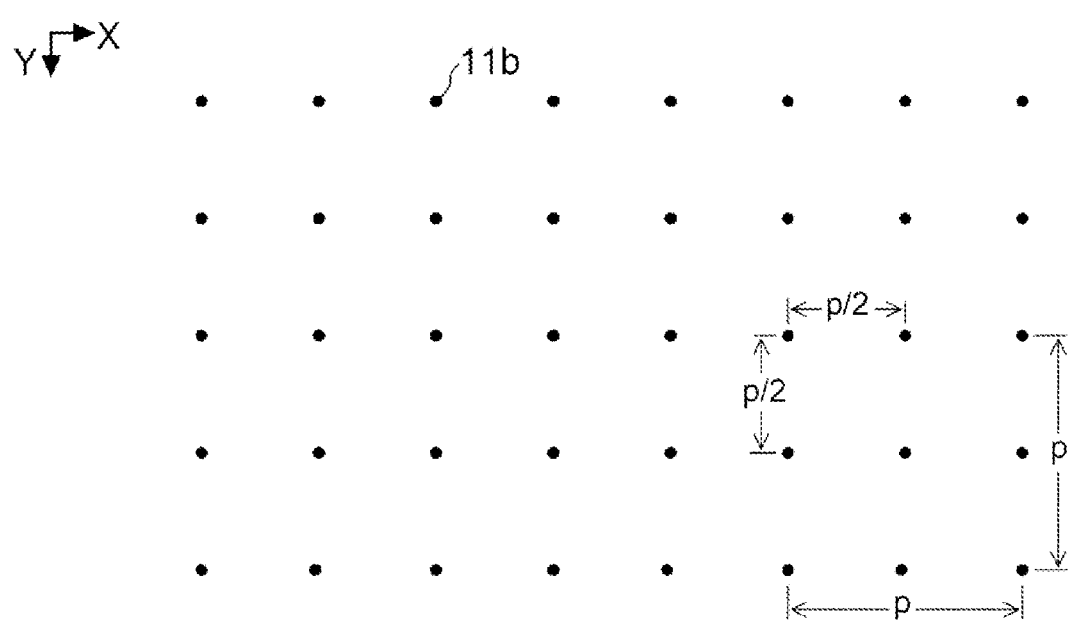
FIG. 8 is a diagram illustrating projection pixels made visible by the projection device.

When a centroid 11g of the panel pixel 11 is focused, the centroid 11g is shifted sequentially by half the pitch p at each of the positions (1) to (4). Thus, all through the sub-frames f1 to f4, the centroids 11g are arrayed at pitches p/2 in each of the Y direction and the X direction, as illustrated in FIG. 8.

Thus, in the display panel 10, although the panel pixels 11 are arrayed in the vertical m rows by the horizontal n columns, the projection pixels can be caused to be visually recognized as if being arrayed in vertical (2m) rows by horizontal (2n) columns, by the shifting by the optical path shifting element 20. In other words, in the present exemplary embodiment, resolution of the display panel 10 is increased to be vertically doubled and horizontally doubled, that is, quadrupled as a whole, in a pseudo manner.

Returning to the description of FIG. 4, the video processing circuit 40 divides the video data Vde-in supplied from the host device 5 for each of the sub-frames f1 to f4, and supplies the divided video data as video data Vid to the display panel 10. Specifically, the video processing circuit 40 temporarily stores the video data Vde-in, reads out, of the stored video data Vde-in, for each of the sub-frames f1 to f4, the video data Vde-in corresponding to the input pixels corresponding to the sub-frame, and supplies the video data Vde-in to display panel 10 as the video data Vid.

The video processing circuit 40 outputs, for each of the sub-frames f1 to f4, a control signal Ctr for controlling driving of the display panel 10.

Furthermore, the video processing circuit 40 outputs, for each of the sub-frames f1 to f4, control signals Psh_X and Psh_Y for controlling the optical path shifting element 20.

Figure 9:
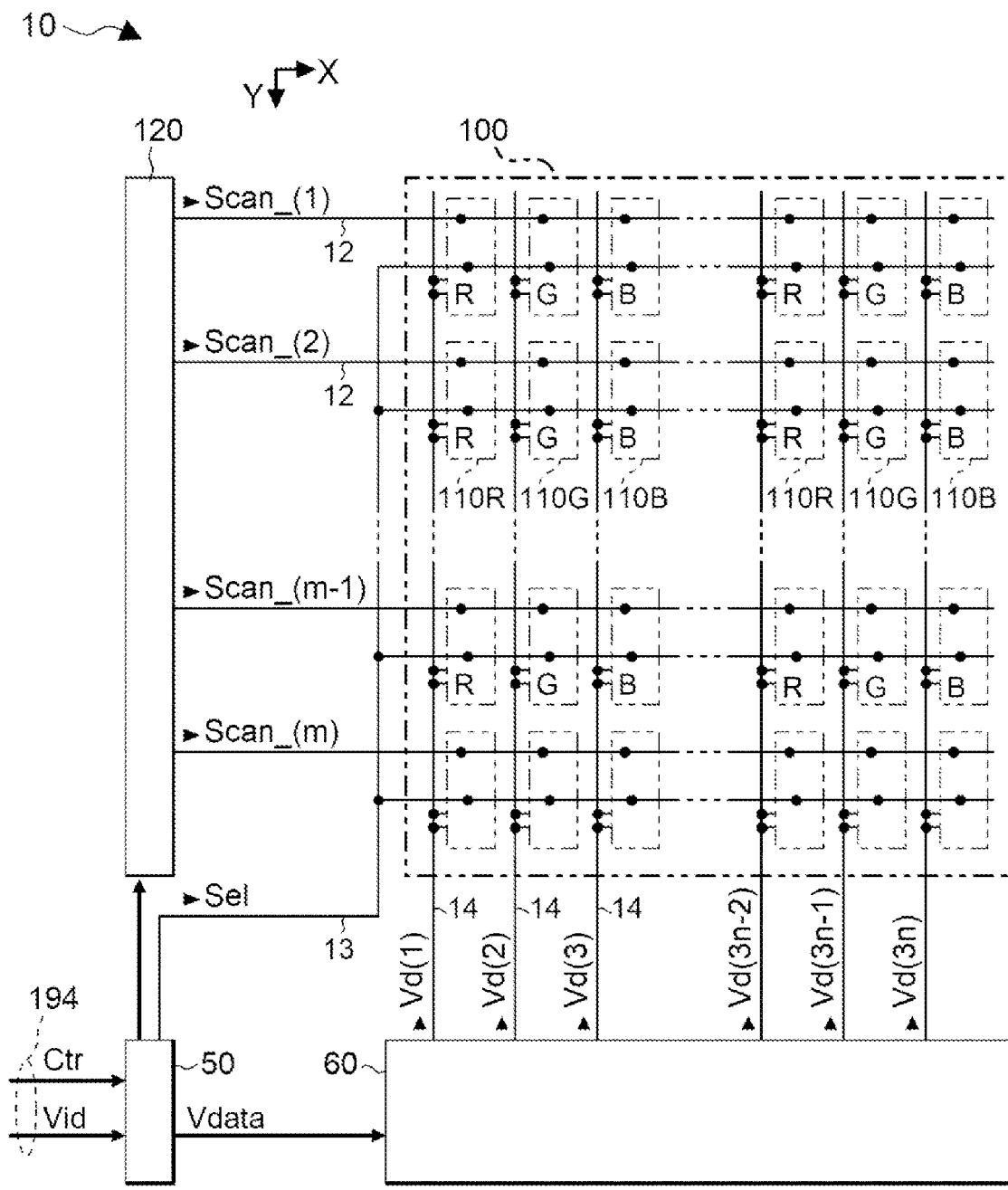
FIG. 9 is a block diagram illustrating an electrical configuration of the display panel.

FIG. 9 is a diagram illustrating an electrical configuration of the display panel 10. As illustrated in the figure, the display panel 10 is substantially divided into a control circuit 50, a data signal output circuit 60, and a scanning line drive circuit 120.

In the display panel 10, scanning lines 12 in m rows are provided along the X direction in the figure, and data lines 14 in (3n) columns are provided along the Y direction to be electrically insulated from each of the scanning lines 12.

To distinguish the rows of the scanning lines 12 from each other, the rows are referred to as a first, a second, a third, . . . , an (m−1)-th, and an m-th row, in order from above in the figure, respectively. Note that, in order to generally explain the scanning line 12 without specifying a row, by using an integer i from 1 to m, notation of "an i-th row" may be used.

Further, to distinguish the columns of the data lines 14 from each other, the columns are referred to as a first, a second, a third, . . . , a (3n−2), a (3n−1)-th, and a (3n)-th column in order from left in the figure, respectively. Note that, the data lines 14 are grouped every three columns. In order to generalize and describe the group, when an integer j from 1 to n is used, it can be said that the data lines 14 in a total of three columns, the (3j−2)-th, (3j−1)-th, and (3n)-th columns, belong to a j-th group, as counted from left.

Pixel circuits 110R, 110G, and 110B are provided corresponding to the scanning lines 12 arrayed in the m rows, and the data lines 14 arrayed in the (3n) columns. Specifically, the pixel circuit 110R is provided corresponding to an intersection between the scanning line 12 in the i-th row, and the data line 14 in the (3j−2)-th column. The pixel circuit 110G is provided corresponding to an intersection between the scanning line 12 in the i-th row, and the data line 14 in the (3j−1)-th column. The pixel circuit 110B is provided corresponding to an intersection between the scanning line 12 in the i-th row, and the data line 14 in the (3j)-th column.

A region in which the pixel circuits 110R, 110G, and 110B are arrayed in the vertical m rows by the horizontal (3n) columns is a display region 100.

The pixel circuit 110R includes an OLED that emits red light, the pixel circuit 110G includes an OLED that emits green light, and the pixel circuit 110B includes an OLED that emits blue light. Thus, the sub-panel pixel 11R is represented by light emission of the OLED included in the pixel circuit 110R, the sub-panel pixel 11G is represented by light emission of the OLED included in the pixel circuit 110G, and the sub-panel pixel 11B is represented by light emission of the OLED included in the pixel circuit 110B.

Note that, since the pixel circuits 110R, 110B, and 110G are circuits for representing the sub-panel pixels 11R, 11G, and 11B, respectively, the pixel circuits are to be referred to as sub-pixel circuits, strictly speaking, but, are referred to as the pixel circuits for convenience in the present description.

The control circuit 50 controls each unit based on the video data Vid and the control signal Ctr supplied from the video processing circuit 40. The control circuit 50 generates various control signals, but details will be described below as appropriate.

The video data Vde-in specifies a gray scale level of an input pixel, for example, with eight bits for each of RGB, but characteristics of luminance specified by the gray scale level and luminance characteristics of the OLED included in the panel pixel 11 do not necessarily match.

Thus, in order to cause the OLED to emit light at luminance corresponding to the gray scale level specified by the video data Vde-in, the control circuit 50 up-converts eight bits for each of RGB in the video data Vde-in into, for example, ten bits, and outputs the bits as video data Vdata that specifies luminance of the OLED of each of RGB, in the present exemplary embodiment. In such up-conversion, a look-up table is used in which a correspondence relationship between the eight bits of the video data Vid-in which is the input, and the ten bits of the video data Vdata which is the output is stored for each of RGB in advance.

Further, although not illustrated in FIG. 4, the control circuit 50 commonly supplies a control signal Enb to all of the pixel circuits 110R, 110G, and 110B.

The scanning line drive circuit 120 is a circuit for driving the pixel circuits 110R, 110G, and 110B arrayed in the m rows by the (3n) columns for each row in accordance with control by the control circuit 50. For example, the scanning line drive circuit 120 supplies scanning signals Scan(1), Scan(2), . . . , Scan(m−1), Scan(m) to the scanning lines 12 in the respective first, second, third, . . . , (m−1)-th, and m-th rows in order, respectively. To generalize, a scanning signal supplied to the scanning line 12 in the i-th row is denoted as Scan(i).

Note that in FIG. 9, in order to avoid complexity of the figure, the number of scanning lines 12 in one row is one, but in practice, the number of scanning lines is "two" for one row. That is, in practice, scanning signals Scan_a(i) and Scan_b(i) are supplied to the two scanning lines 12 corresponding to the i-th row, respectively.

The data signal output circuit 60 is a circuit that outputs a data signal of a voltage corresponding to a gray scale level toward each of the pixel circuits 110R, 110G, and 110B located in a row selected by the scanning line drive circuit 120. Specifically, the data signal output circuit 60 latches the video data Vdata supplied from the control circuit 50 for one row, converts the latched video data Vdata for the one row into an analog data signal, and outputs the video data Vdata to the corresponding data line 14 as the data signal.

Note that, potentials of the data lines 14 in the respective first, second, third, . . . , (3n−2)-th, (3n−1)-th, and (3n)-th columns are referred to as Vd(1), Vd(2), Vd(3), . . . , Vd(3n−2), Vd(3n−1), and Vd(3n), respectively.

Additionally, in the present description, a reference of a voltage zero is an L level of a logical level (ground potential), but except for a voltage (threshold voltage) between two points, potential and voltage are not strictly used in the present description. In addition, in the present description, a power supply refers to substantially temporally constant voltage and potential.

Electrical configurations of the respective pixel circuits 110R, 110G, and 110B are identical to each other. Therefore, the electrical configurations of the respective pixel circuits 110R, 110G, and 110B will be described with the pixel circuit 110R located in the i-th row and the (3j−2)-th column as a representative.

Figure 10:
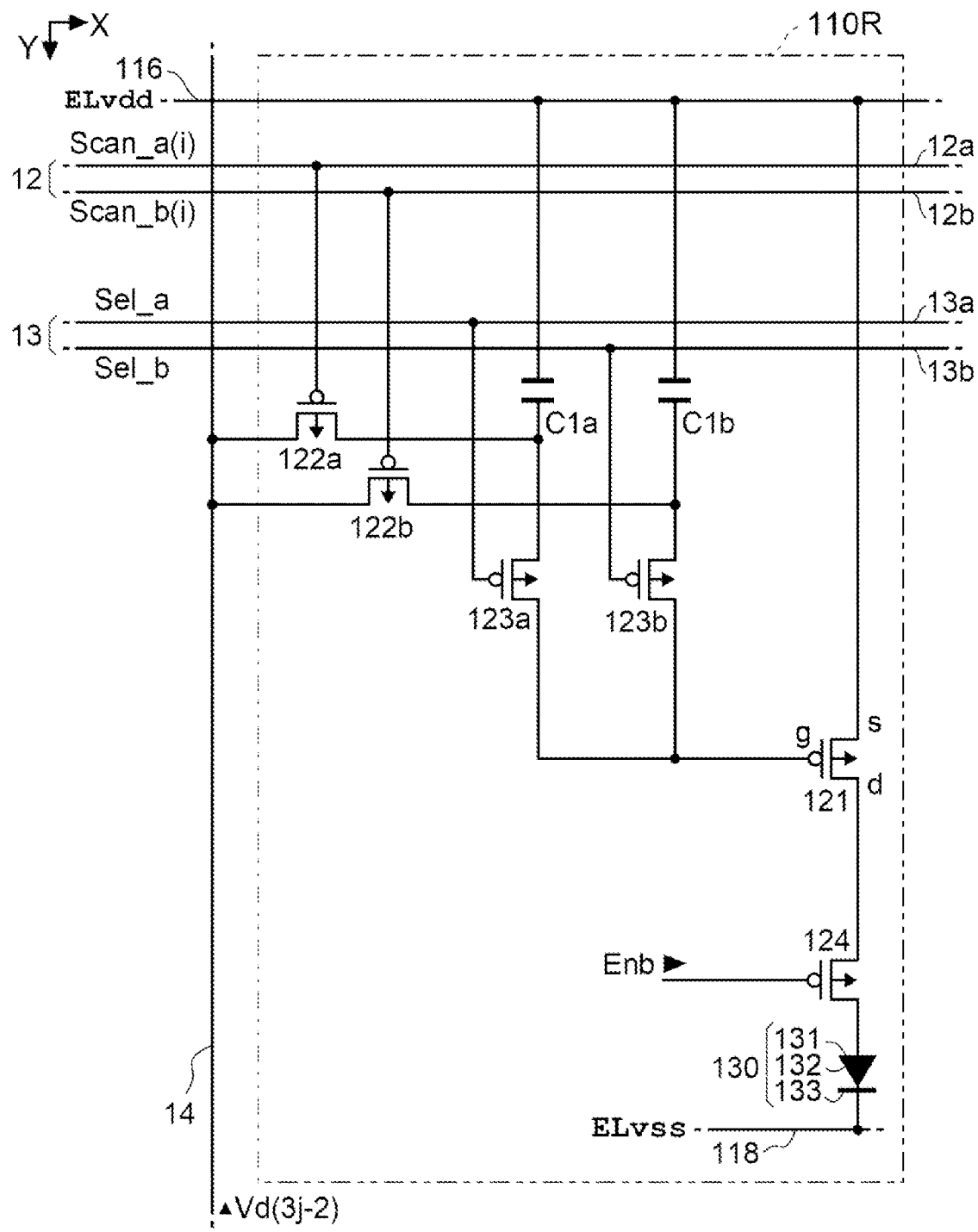
FIG. 10 is a diagram illustrating a pixel circuit in the display panel.

FIG. 10 is a circuit diagram illustrating the electrical configuration of the pixel circuit 110R located in the i-th row and the (3j−2)-th column. As illustrated in the figure, the pixel circuit 110R includes an OLED 130, p-channel MOS type transistors 121, 122a, 122b, 123a, 123b, 124, capacitance elements C1a, and C1b. Note that, MOS is an abbreviation of Metal-Oxide-Semiconductor Field Effect Transistor.

To the pixel circuits 110R, 110G, and 110B in the i-th row, the scanning signal Scan_a(i) is supplied via one scanning line 12a of the two scanning lines 12 corresponding to the i-th row, and the scanning signal Scan_b(i) is supplied via another scanning line 12b.

The OLED 130 is a light-emitting element in which a light emission function layer 132 is sandwiched between a pixel electrode 131 and a common electrode 133. The pixel electrode 131 functions as an anode, and the common electrode 133 functions as a cathode. Note that, the common electrode 133 has light reflectivity and optical transparency. In the OLED 130, when a current flows from the anode to the cathode, holes injected from the anode and electrons injected from the cathode are recombined in the light emission function layer 132 to generate excitons, and white light is generated.

Note that, when the pixel circuits 110R, 110G, and 110B are individually viewed, the generated white light resonates in an optical resonator including a reflection layer and a semi-reflective semi-transmissive layer (not illustrated), and is emitted with a resonance wavelength set corresponding to each of red, green, and blue colors. A color filter corresponding to the color is provided in the Z direction, which is a direction of emitted light from the optical resonator. Thus, the emitted light from the OLED 130 is visually recognized through coloration by the optical resonator and the color filter. The optical resonator is not illustrated.

In the pixel circuit 110R in the i-th row and the (3j−2)-th column, in the transistor 122a, a source node is connected to the data line 14 in the (3j−2)-th column, a drain node is connected to one end of a capacitance element C1a and a source node of the transistor 123a, and a gate node is connected to the scanning line 12a. In the transistor 122b, a source node is connected to the data line 14 in the j-th column, a drain node is connected to one end of a capacitance element C1b and a source node of the transistor 123b, and a gate node is connected to the scanning line 12b. Another end of the capacitance element C1a and another end of the capacitance element C1b are connected to a power supply wiring line 116 to which a high level power supply potential ELvdd is supplied.

In the transistor 123a, a gate node is connected to a control line 13a to which a selection signal Sel_a is supplied. In the transistor 123b, a gate node is connected to a control line 13b to which a selection signal Sel_b is supplied. A drain node of the transistor 123a and a drain node of the transistor 123b are connected to a gate node g of the transistor 121.

In the transistor 121, a source node s is connected to the power supply wiring line 116, and a drain node d is connected to a source node of a transistor 124. In the transistor 124, a gate node is supplied with the control signal Enb, and a drain node is connected to the pixel electrode 131 of the OLED 130. Note that in the OLED 130, the common electrode 133 is supplied with a low power supply potential ELvss via a power supply wiring line 118.

Note that, in the present description, "electrically connected" or simply "connected" means direct or indirect coupling or joint among two or more elements, and includes, for example, coupling, not directly, among two or more elements in a semiconductor substrate via different wiring layers and a contact hole.

Figure 11:
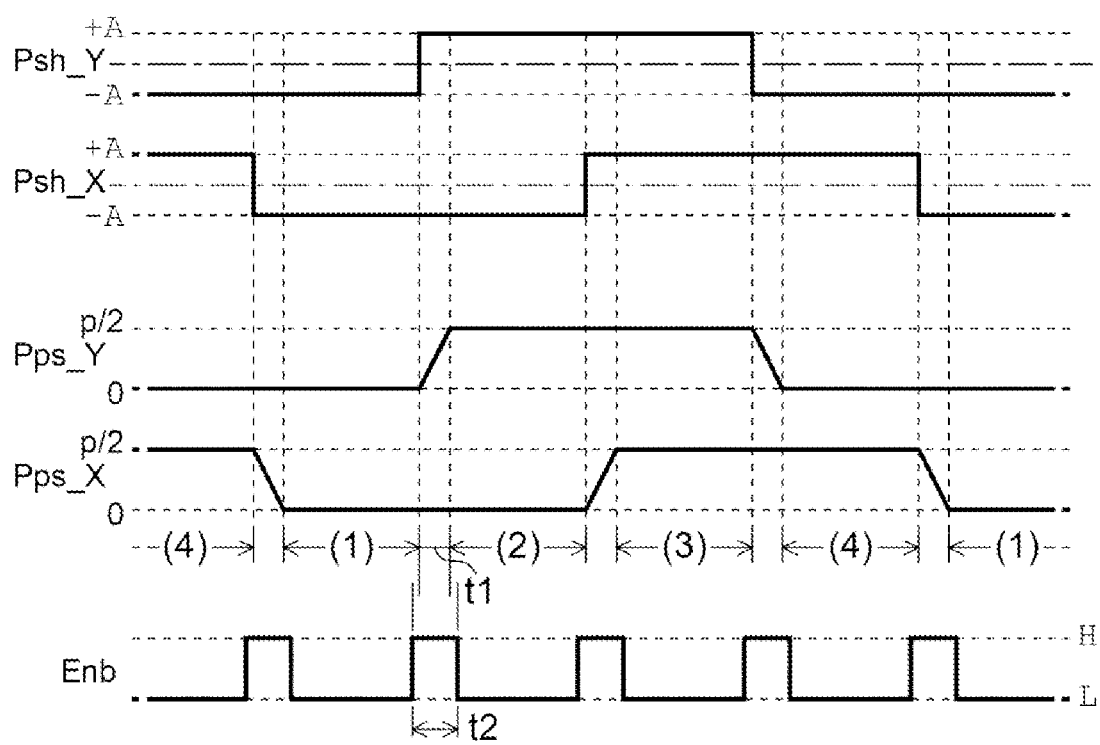
FIG. 11 is a timing chart illustrating control signals and the like to an optical path shifting element.

FIG. 11 is a timing chart for explaining operation and the like of the optical path shifting element 20. The video processing circuit 40 supplies the control signals Psh_Y and Psh_X to the optical path shifting element 20 to shift the projection image Img onto the screen Scr in each of the Y direction and the X direction.

Specifically, the control signal Psh_Y shifts a position of the projection image Img onto the screen Scr in the Y direction, and the control signal Psh_X shifts the position of the projection image Img in the X direction. The control signals Psh_Y and Psh_X each take a voltage −A or +A. The optical path is changed to any of the first to fourth optical paths in accordance with the voltage of the control signals Psh_Y or Psh_X. When there is no change in the voltage of each of the control signals Psh_Y and Psh_X, the optical path is maintained.

Here, assume that, when the voltage of the control signal Psh_Y is −A, and the voltage of the control signal Psh_X is −A, the projection image Img is at the position (1) on the screen Scr. For convenience, assume that coordinate positions Pps_Y and Pps_X of a certain projection pixel (for example, a projection pixel at an upper left end in the display region 100) of the projection image Img at the position (1) are both zero that is a reference. The optical path in this case is the first optical path.

When the voltage of the control signal Psh_Y changes to +A, the position of the projection pixel is shifted by half the pitch p in the Y direction, the coordinate position Pps_Y is p/2, and the voltage of the control signal Psh_X changes to +A, the position of the projection pixel is shifted by half the pitch p in the X direction, and the coordinate position Pps_X is p/2.

Thus, when the voltage of the control signal Psh_Y is −A, and the voltage of the control signal Psh_X is −A, the projection pixel is at the position (1), and when the voltage of the control signal Psh_Y is +A, and the voltage of the control signal Psh_X is −A, the projection pixel is at the position (2). Further, when the voltage of the control signal Psh_Y is +A and the voltage of the control signal Psh_X is +A, the projection pixel is at the position (3) and when the voltage of the control signal Psh_Y is −A, and the voltage of the control signal Psh_X is +A, the projection pixel is at the position (4).

Note that, when the control signal Psh_Y and Psh_X change to the voltage −A or +A, the position of the projection pixel (projection image Img) that is shifted by the optical path shifting element 20 is not immediately determined, and a delay of a period t1 is involved. That is, when the period t1 elapses since the voltage of the control signal Psh_Y or Psh_X changes, the position of the projection pixel is stabilized.

Further, the control circuit 50 outputs the control signal Enb as described below, corresponding to an output change of the control signals Psh_Y and Psh_X by the video processing circuit 40. In other words, the control circuit 50 outputs the control signal Enb that is at an H level in a period t2 including the period t1 described above, and is at the L level in the other periods.

Figure 12:
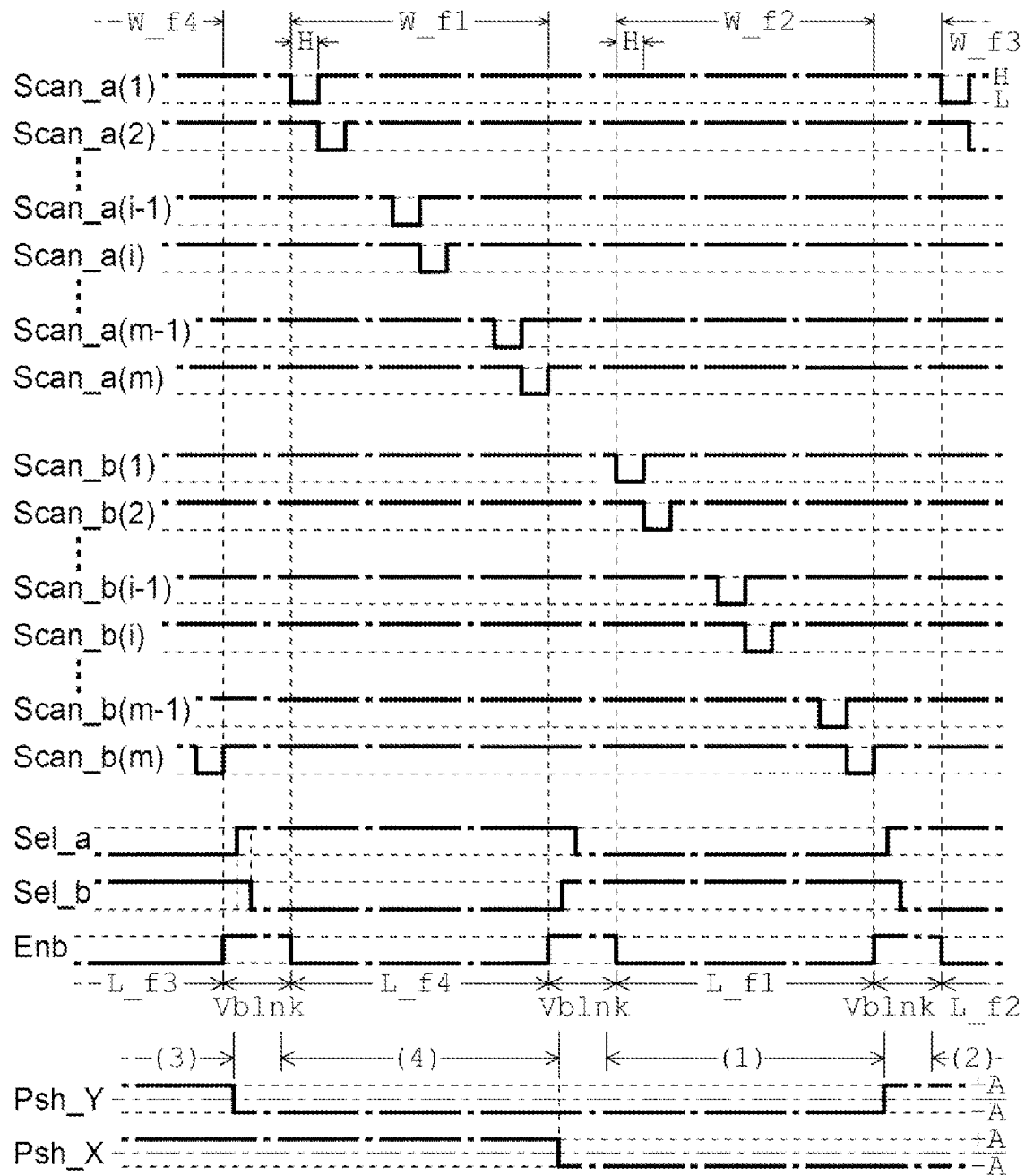
Figure 13:
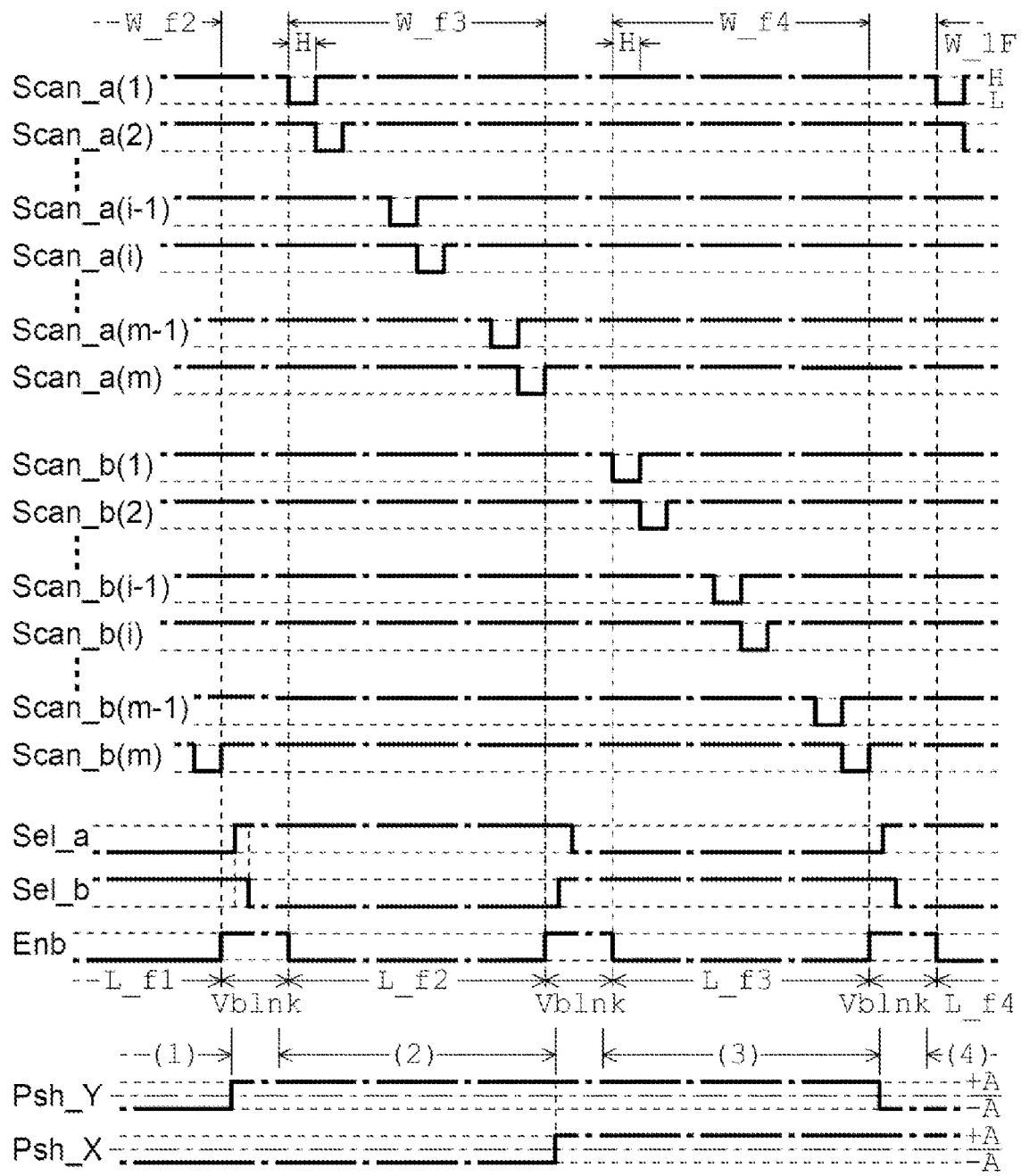

FIG. 12 and FIG. 13 are each a timing chart for explaining operation of the projection device 1.

As described above, the one frame F includes the four sub-frames f1 to f4, which correspond to first to fourth periods, respectively. In the present exemplary embodiment, in terms of data writing, the sub-frame includes writing sub-frames W_f1 to W_f4 for writing data signals to the pixel circuits 110R, 110G, and 110B, and a vertical scanning line flyback period Vblnk. In addition, in the present exemplary embodiment, in terms of light emission, the sub-frame includes light-emitting sub-frames L_f1 to L_f4 for causing a current, based on a voltage of the written data signal, to flow through the OLED 130, and the vertical scanning line flyback period Vblnk.

Specifically, the writing sub-frames W_f1 to W_f4 are periods for writing data signals corresponding to the sub-frames f1 to f4 in order to the pixel circuits 110R, 110G, and 110B, and the light-emitting sub-frames L_f1 to L_f4 are periods for causing a current based on a voltage of the data signal written in the sub-frames W_f1 to W_f4 to flow through the OLED 130 to emit light.

In addition, in the present exemplary embodiment, the first to fourth periods correspond to the writing sub-frames W_f1 to W_f4, or the light-emitting sub-frames L_f4, L_f1 to L_f3, respectively. The vertical scanning line flyback period Vblnk corresponds to a light-out period.

Note that in the present exemplary embodiment, periods of the respective writing sub-frames W_f1 to W_f4 match periods of the respective light-emitting sub-frames L_f4, L_f1 to L_f3, respectively. In addition, "writing" refers to operation for causing the capacitance element C1a or C1b to hold a voltage of a data signal.

In the writing sub-frames W_f1 and W_f3, scanning signals Scan_a(1), Scan_a(2), ..., Scan_a(m−1), Scan_a(m) are exclusively set to the L level in order for each horizontal scanning period H. In addition, in the writing sub-frames W_f2 and W_f4, scanning signals Scan_b(1), Scan_b(2), ..., Scan_b(m−1), Scan_b(m) are exclusively set to the L level in order for each horizontal scanning period H.

In the present exemplary embodiment, a period since the scanning signal Scan_a(1) changes to the L level in the writing sub-frame W_f1 (or W_f3) until the scanning signal Scan_a(m) changes to the H level, and a period since the scanning signal Scan_b(1) changes to the L level in the writing sub-frame W_f2 (or W_f4) until the scanning signal Scan_b(m) changes to the H level may be each referred to as a vertical effective scanning period.

Further, in a period other than the vertical effective scanning period, in particular, a period since the scanning signal Scan_a(m) changes to the H level in the writing sub-frame W_f1 (or W_f3) until the scanning signal Scan_b(1) changes to the L level in the writing sub-frame W_f2 (or W_f4), and a period since the scanning signal Scan_b(m) changes to the H level in the writing sub-frame W_f2 (or W_f4) until the scanning signal Scan_a(1) changes to the L level in the writing sub-frame W_f3 (or W_f1) are each the vertical scanning line flyback period Vblnk.

In the present exemplary embodiment, the control signal Enb is at the L level in the light-emitting sub-frame L_f2, L_f3, L_f4, and L_f1, which are the vertical effective scanning periods, and is at the H level in the vertical scanning line flyback periods that are the other periods. Note that, the vertical scanning line flyback period corresponds to the period t2 described above.

In addition, the control signal Psh_Y to the optical path shifting element 20 has the voltage −A when the writing sub-frame W_f4 ends, and has the voltage +A when the writing sub-frame W_f2 ends. The control signal Psh_X has the voltage −A when the writing sub-frame W_f1 ends, and has the voltage +A when the writing sub-frame W_f3 ends.

Although omitted in FIG. 12 and FIG. 13, after the voltage of the control signal Psh_Y or Psh_X changes at the start of the vertical scanning line flyback period, and until the start of the next vertical effective scanning period, the shifting of the optical path by the optical path shifting element 20 is completed, the state is maintained, and a position by the projection pixel is stabilized.

In the first exemplary embodiment, in the writing sub-frames W_f1 and W_f3 (light-emitting sub-frames L_f4 and L_f2), the selection signal Sel_a is at the H level, the selection signal Sel_b is at the L level, and in the writing sub-frames W_f2 and W_f4 (light-emitting sub-frames L_f1 and L_f3), the selection signal Sel_a is at the L level, and the selection signal Sel_b is at the H level.

Note that, in the vertical scanning line flyback period after each of the writing sub-frames W_f1 and W_f3, the selection signal Sel_b changes from the L to H level temporally earlier, and the selection signal Sel_a changes from the H to L level temporally later. In the vertical scanning line flyback period after each of the writing sub-frames W_f2 and W_f4, the selection signal Sel_a changes from the L to H level temporally earlier, and the selection signal Sel_b changes from the H to L level temporally later.

The operation of the projection device 1 in the writing sub-frame W_f1 will be described.

In the writing sub-frame W_f1, the following three steps of operation are mainly performed.

Specifically, in the writing sub-frame W_f1, first, operation is performed for causing the capacitance element C1a of each of the pixel circuits 110R, 110G, and 110B to hold, as video data Vdata, an input pixel in an odd-numbered row and an odd-numbered column, among the input pixels arrayed in the vertical (2m) by the horizontal (2n) columns in the video data Vde-in.

In the writing sub-frame W_f1, second, operation is performed for shifting a projection pixel by the optical path shifting element 20 to the position (4). The optical path is shifted to the fourth optical path.

In the writing sub-frame W_f1, that is, in the light-emitting sub-frame L_f4, third, operation is performed for supplying a current corresponding to a voltage held in the capacitance element C1b of each of the pixel circuits 110R, 110G, and 110B to the OLED 130.

In a detailed description of the first operation, in the writing sub-frame W_f1, the video processing circuit 40 outputs, as the video data Vid, the input pixel in the odd-numbered row and the odd-numbered column, among the input pixels arrayed in the vertical (2m) rows by the horizontal (2n) columns in the video data Vde-in supplied from the host device 5. Note that, among the input pixels arrayed in the vertical (2m) rows by the horizontal (2n) columns, the input pixels in the odd-numbered row and the odd-numbered column is the input pixel that is hatched in the first stage of FIG. 7 (sub-frame f1).

In the writing sub-frame W_f1, the control circuit 50 converts the video data Vde-in into the video data Vdata row by row in synchronization with the timing at which the scanning signals Scan_a(1) to Scan_a(m) are sequentially set to the L level, and outputs the video data Vdata.

In addition, in the writing sub-frame W_f1, for example, in a period where the scanning signal Scan_a(i) is at the L level, the data signal output circuit 60 converts gray scale levels of the sub-panel pixels 11R, 11G, and 11B in the i-th row and the first column to the i-th row and the (3n)-th column expressed by the video data Vdata to analog potentials Vd_(1) to Vd_(3n), respectively, and outputs the potentials to the data lines 14 in the first to the (3n)-th columns, respectively.

For the (3j−2)-th column, the data signal output circuit 60 converts the gray scale level corresponding to the sub-panel pixel 11R in the i-th row and the (3j−2)-th column, of the video data Vdata, into the potential Vd(3j−2) being an analog signal, and outputs the potential Vd(3j−2) to the data line 14 in the (3j−2)-th column as the data signal.

Note that, the gray scale level corresponding to the sub-panel pixel 11R in the i-th row and the (3j−2) column refers to a gray scale level obtained by converting a gray scale level of eight bits corresponding to an R component of the input pixel in a (2i−1)-th row and the j-th column, among the input pixels arrayed in the vertical (2m) rows by the horizontal (2n) columns, to ten bits.

When the scanning signal Scan_a(i) is at the L level, in the pixel circuit 110 in the i-th row and the (3j−2)-th column, the transistor 122a is in an on state. In a period where the scanning signal Scan_a(i) is at the L level, the scanning signal Scan_b(i) is at the H level, and thus, in the pixel circuit 110 in the i-th row and the (3j−2)-th column, the transistor 122b is in an off state.

Thus, the data signal of the potential Vd(3j−2) is held in the capacitance element C1a sequentially via the data line 14 in the (3j−2)-th row, and the transistor 122a in the pixel circuit 110R in the i-th row and the (3j−2)-th column.

Here, the pixel circuit 110R in the i-th row and the (3j−2)-th column has been described, but similarly for the pixel circuits 110R, 110G, and 110B in a column other than the (3j−2)-th column in the i-th row, a data signal is held in the capacitance element C1a.

Note that, in the present description, an "on state" of a switching element or a transistor means that a both ends of the switching element, or a source node and a drain node in the transistor are electrically closed to be in a low impedance state. Also, an "off state" of the switching element or the transistor means that both the ends of the switching element, or the source node and the drain node are electrically open to be in a high impedance state.

In the writing sub-frame W_f1, even in a row other than the i-th row, when the scanning signals Scan_a(1) to Scan (m) are sequentially and exclusively at the L level, a data signal is held in the capacitance element C1a in each of all of the pixel circuits 110R, 110G, and 110B.

In a detailed description of the second operation, the video processing circuit 40, after the writing sub-frame W_f4, sets the control signal Psh_Y to the voltage −A, and sets the control signal Psh_X to the voltage +A. Thus, in the light-emitting sub-frame L_f4, the projection pixel is shifted to the position (4), and is stable. The optical path is shifted to the fourth optical path, and the state is maintained.

In a detailed description of the third operation, in the writing sub-frame W_f1, the selection signal Sel_a is at the H level, and the selection signal Sel_b is at the L level. Thus, in each of all of the pixel circuits 110R, 110G, and 110B, the transistor 123a is in the off state, and the transistor 123b is in the on state.

Thus, in each of all of the pixel circuits 110R, 110G, and 110B, one end of the capacitance element C1b is electrically coupled to the gate node g of the transistor 121 via the transistor 123b, and thus, the voltage held in the capacitance element C1b is applied between the gate node and the source node in the transistor 121.

In addition, in the writing sub-frame W_f1 (light-emitting sub-frame L_f4), the control signal Enb is at the L level, and thus the transistor 124 is in the on state.

Thus, in the light-emitting sub-frame L_f4, in each of all of the pixel circuits 110R, 110G, and 110B, the transistor 121 causes a current corresponding to the voltage between the gate node and the source node, that is, the gray scale level of the pixel, to flow through the OLED 130.

The voltage held in the capacitance element C1b is based on the data signal supplied via the data line 14 in the writing sub-frame W_f4 in the previous frame. Thus, in the light-emitting sub-frame L_f4, the OLEDs 130 in all of the pixel circuits 110R, 110G, and 110B emit light at luminance corresponding to the sub-panel pixels 11R, 11G, and 11B in the sub-frame f4. Then, the projection pixel by the light emission is visually recognized at the position (4) on the screen Scr.

The operation of the projection device 1 in the writing sub-frame W_f2 is similar to that in the writing sub-frame W_f1 except for the following points.

That is, the operation in the writing sub-frame W_f2 is different from the operation in the writing sub-frame W_f1, in that, first, in the writing sub-frame W_f2, the video processing circuit 40 outputs an input pixel in an even-numbered row and the odd-numbered column as the video data Vdata among the input pixels arrayed in the vertical (2m) rows by the horizontal (2n) columns in the video data Vde-in, second, the video processing circuit 40 sets the control signal Psh_Y to the voltage −A, and sets the control signal Psh_X to the voltage −A, and sets the projection pixel by the optical path shifting element 20 at the position (1), and third, the control circuit 50 sets the selection signal Sel_a to the L level, and sets the selection signal Sel_b to the H level. The optical path is shifted to the first optical path, and that state is maintained.

In the writing sub-frame W_f2, in each of all of the pixel circuits 110R, 110G, and 110B, while a voltage of a data signal corresponding to the input pixel in the even-numbered row and the odd-numbered column, among the input pixels arrayed in the vertical (2m) rows by the horizontal (2n) columns in the video data Vde-in, is held in the capacitance element C1b, a current corresponding to the voltage held in the capacitance element C1a (voltage written in the sub-frame W_f1) is supplied to the OLED 130.

Therefore, in the writing sub-frame W_f2 (light-emitting sub-frame L_f1), the OLEDs 130 in all of the pixel circuits 110R, 110G, and 110B emit light at luminance corresponding to the sub-panel pixels 11R, 11G, and 11B in the sub-frame f1, and the projection pixel by the light emission will be visually recognized at the position (1) on the screen Scr.

The operation of the projection device 1 in the writing sub-frame W_f3 is similar to that in the writing sub-frame W_f1 except for the following points.

That is, the operation in the writing sub-frame W_f3 is different from the operation in the writing sub-frame W_f1, in that, first, in the writing sub-frame W_f2, the video processing circuit 40 outputs an input pixel in the even-numbered row and an even-numbered column as the video data Vdata among the input pixels arrayed in the vertical (2m) rows by the horizontal (2n) columns in the video data Vde-in, and second, the video processing circuit 40 sets the control signal Psh_Y to the voltage +A, sets the control signal Psh_X to the voltage −A, and sets the projection pixel by the optical path shifting element 20 at the position (2). The optical path is shifted to the second optical path, and that state is maintained.

In the writing sub-frame W_f3, in each of all of the pixel circuits 110R, 110G, and 110B, while a voltage of a data signal corresponding to the input pixel in the even-numbered row and the even-numbered column, among the input pixels arrayed in the vertical (2m) rows by the horizontal (2n) columns in the video data Vde-in, is held in the capacitance element C1a, a current corresponding to the voltage held in the capacitance element C1b (voltage written in the sub-frame W_f2) is supplied to the OLED 130.

Therefore, in the writing sub-frame W_f3 (light-emitting sub-frame L_f2), the OLEDs 130 in all of the pixel circuits 110R, 110G, and 110B emit light at luminance corresponding to the sub-panel pixels 11R, 11G, and 11B in the sub-frame f2, and the projection pixel by the light emission will be visually recognized at the position (2) on the screen Scr.

The operation of the projection device 1 in the writing sub-frame W_f4 is similar to that in the writing sub-frame W_f1 except for the following points.

That is, the operation in the writing sub-frame W_f3 is different from the operation in the writing sub-frame W_f1, in that, first, in the writing sub-frame W_f4, the video processing circuit 40 outputs an input pixel in the odd-numbered row and the even-numbered column as the video data Vdata among the input pixels arrayed in the vertical (2m) rows by the horizontal (2n) columns in the video data Vde-in, second, the video processing circuit 40 sets the control signal Psh_Y to the voltage +A, sets the control signal Psh_X to the voltage +A, and sets the projection pixel by the optical path shifting element 20 at the position (3), and third, the control circuit 50 sets the selection signal Sel_a to the L level, and sets the selection signal Sel_b to the H level. The optical path is shifted to the third optical path, and that state is maintained.

In the writing sub-frame W_f4, in each of all of the pixel circuits 110R, 110G, and 110B, while a voltage of a data signal corresponding to the input pixel in the odd-numbered row and the even-numbered column, among the input pixels arrayed in the vertical (2m) rows by the horizontal (2n) columns in the video data Vde-in, is held in the capacitance element C1b, a current corresponding to the voltage held in the capacitance element C1a (voltage written in the sub-frame W_f3) is supplied to the OLED 130.

Therefore, in the writing sub-frame W_f4 (light-emitting sub-frame L_f3), the OLEDs 130 in all of the pixel circuits 110R, 110G, and 110B emit light at luminance corresponding to the sub-panel pixels 11R, 11G, and 11B in the sub-frame f3, and the projection pixel by the light emission will be visually recognized at the position (3) on the screen Scr.

Figure 14:
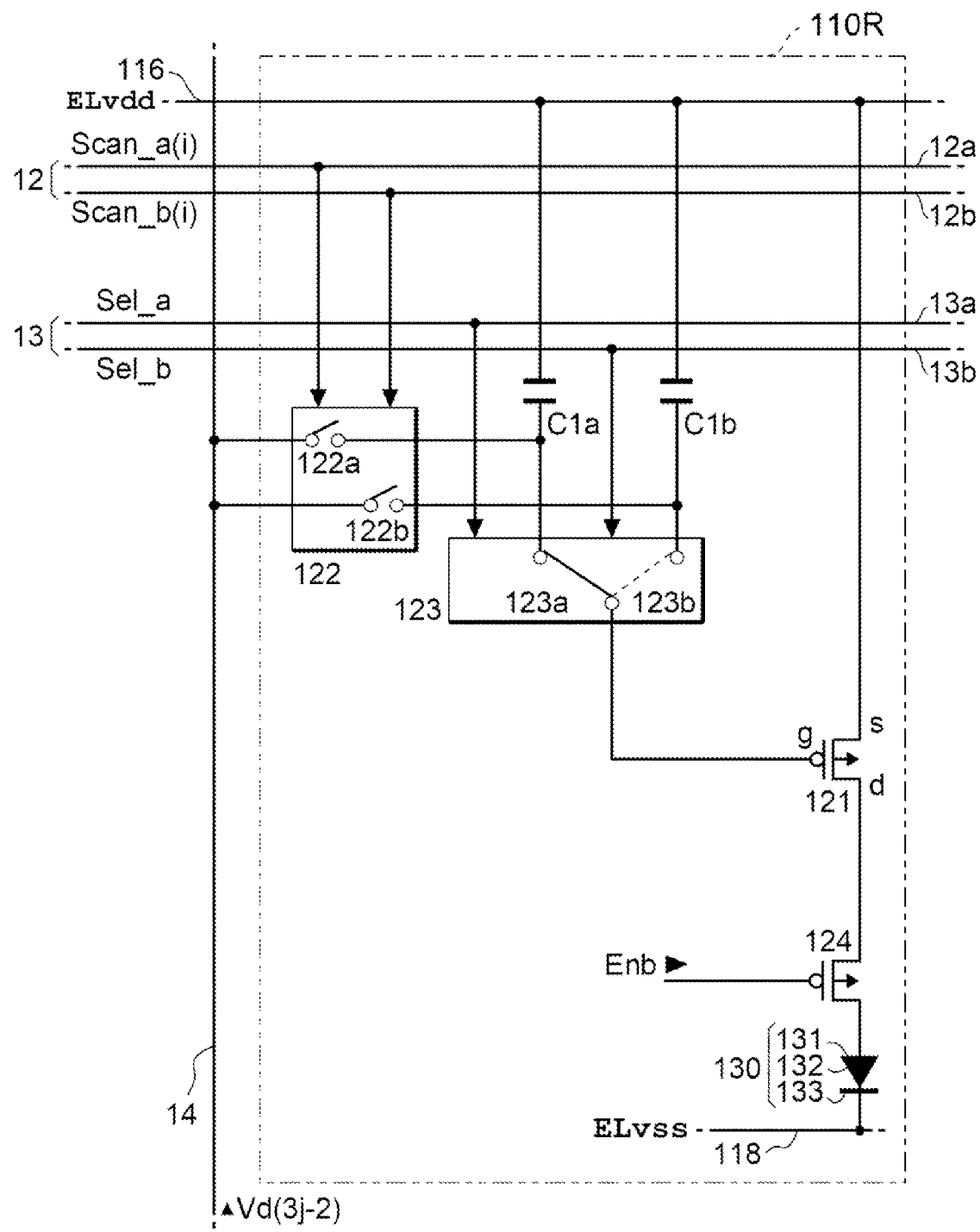
FIG. 14 is a diagram illustrating an equivalent circuit of the pixel circuit in the first exemplary embodiment.

It can be grasped that, the pixel circuits 110R, 110G, and 110B of the display panel 10 in the projection device 1 according to the first exemplary embodiment each have a configuration as illustrated in FIG. 14, for example, when the pixel circuit 110R is used as an example.

The transistors 122a and 122b in FIG. 10 can be grasped as a first selector 122 as illustrated in FIG. 14. Specifically, the first selector 122, when the scanning line 12a is selected in each of the writing sub-frames W_f1 and W_f3, and the scanning signal Scan_a(i) is at the L level, electrically connects the one end of the capacitance element C1a to the data line 14 in the (3j−2)-th column, and when the scanning line 12b is selected in each of the writing sub-frames W_f2 and W_f4, and the scanning signal Scan_b(i) is at the L level, electrically connects the one end of the capacitance element C1b to the data line 14 in the (3j−2)-th column.

Also, the transistors 123a and 123b in FIG. 10 can be grasped as a second selector 123 as illustrated in FIG. 14. Specifically, the second selector 123, in each of the writing sub-frame W_f1 and W_f3, when the selection signal Sel_a is at the H level, and the selection signal Sel_b is at the L level, electrically connects the one end of the capacitance element C1b to the gate node g of the transistor 121, and in each of the writing sub-frames W_f2 and W_f4, when the selection signal Sel_a is at the L level, and the selection signal Sel_b is at the H level, electrically connects the one end of the capacitance element C1a to the gate node g of the transistor 121.

In other words, the transistor 121 is an example of a driving transistor, the transistor 122a is an example of a first switching element, the transistor 122b is an example of a second switching element, the transistor 123a is an example of a third switching element, and the transistor 123b is an example of a fourth switching element. Also, the capacitance element C1a is an example of a first capacitance element, and the capacitance element C1b is an example of a second capacitance element.

Next, suppression of deterioration in display quality of an image projected by the projection device 1 according to the present exemplary embodiment will be described.

Figure 15:
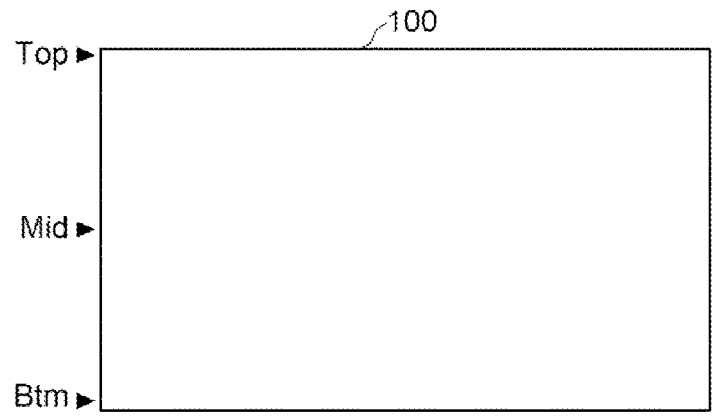
FIG. 15 is a diagram for explaining a projected image.

FIG. 15 is a diagram illustrating the display region 100. Top indicates an upper end of the display region 100, that is, a first line, Mid indicates a middle of the display region 100, that is, a (m/2)-th line, and Btm indicates a lower end of the display region 100, that is, an m-th line.

Figure 22:
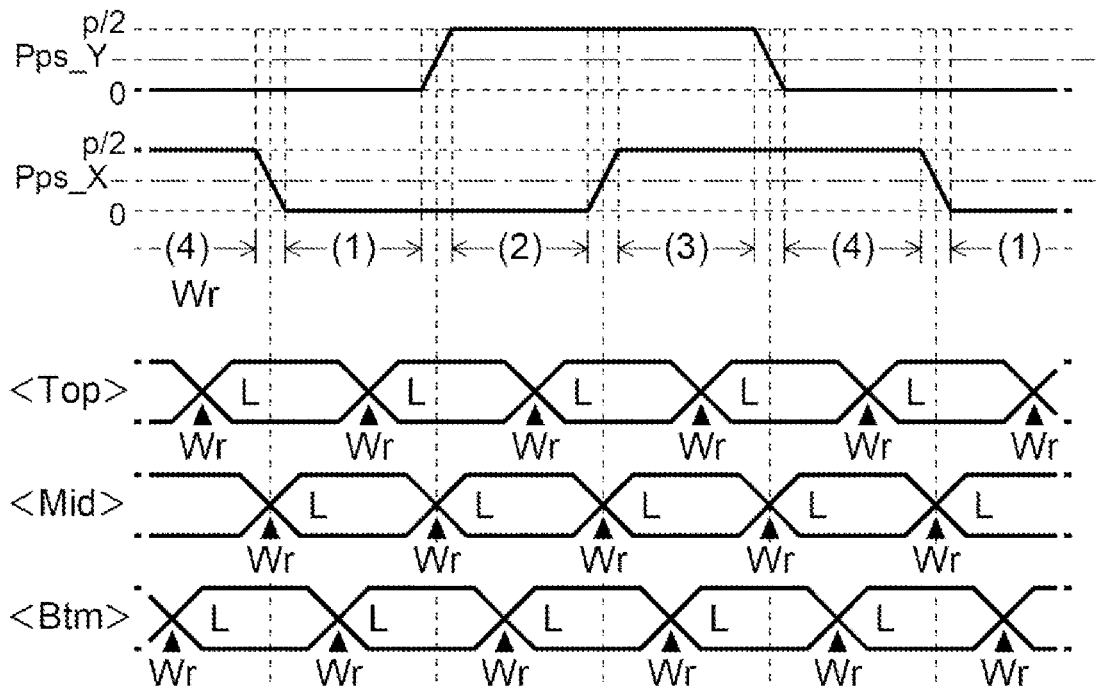
FIG. 22 is a timing chart illustrating operation of a display panel according to a first comparative example.

FIG. 22 is a diagram for explaining deterioration in display quality in a first comparative example. In the first comparative example, line sequential driving is illustrated in which, a scanning line is selected for each horizontal scanning period H, a data signal is written, and luminance is set corresponding to the written data signal.

Note that, Wr indicates write timing of a data signal, and L indicates that luminance is in a state corresponding to the written data signal.

In the first comparative example, when an optical path shifting element is configured to shift an optical path at write timing of the middle Mid of the display region 100, a panel pixel in the middle Mid is visually recognized at a position shifted by the shifting element at luminance of a sub-frame, but a panel pixel in each of the upper end Top and the lower end Btm is visually recognized at a position shifted by the optical path shifting element at luminance across preceding and succeeding sub-frames.

Thus, in the first comparative example, the panel pixel located at each of the upper end Top and the lower end Btm is not visually recognized correctly at the position shifted by the optical path shifting element, and thus deterioration in display quality occurs due to a discrepancy in the display at the shifted position.

Figure 23:
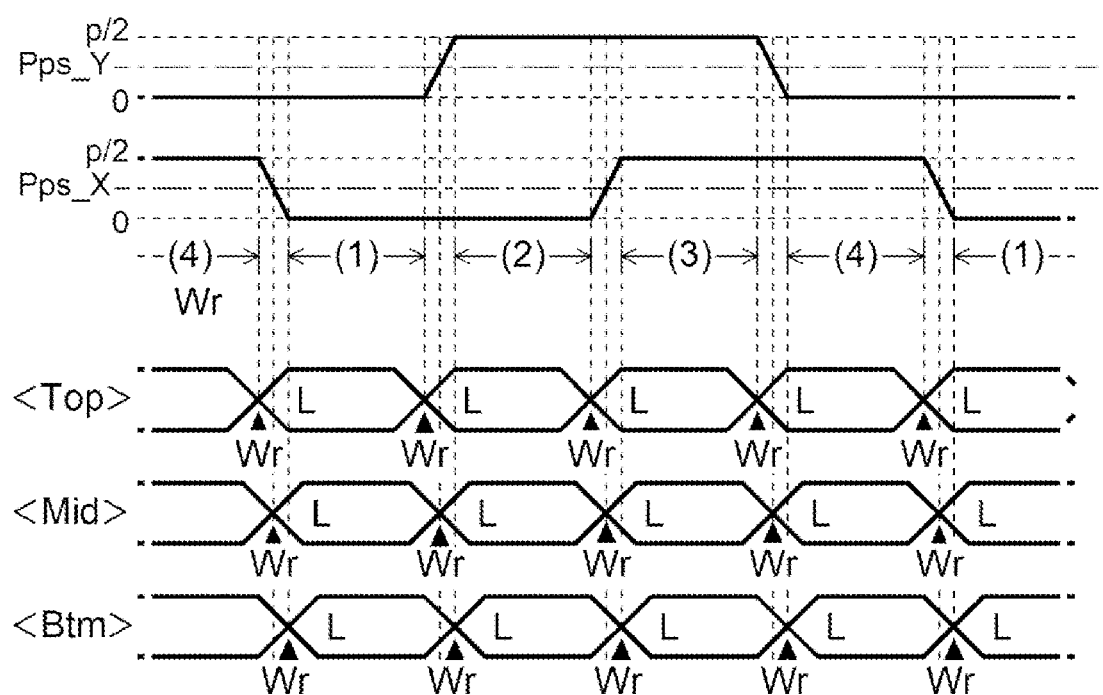
FIG. 23 is a timing chart illustrating operation of a display panel according to a second comparative example.

FIG. 23 is a diagram for explaining deterioration in display quality in a second comparative example. The second comparative example is a configuration in which the horizontal scanning period H is shortened, that is, a period of time for writing a data signal is shortened, a vertical scanning line flyback period is enlarged accordingly, and the enlarged vertical scanning line flyback period is adjusted to a period where a position shifted by an optical path shifting element is stabilized.

In the second comparative example, as in the first comparative example, a panel pixel in each of the upper end Top, the middle Mid, and the lower end Btm is substantially equally visible at a position shifted by the optical path shifting element, and thus, deterioration in display quality due to a discrepancy in the display at the shifted position is considered to be suppressed.

However, in the second comparative example, since the time for writing the data signal is shortened, a situation occurs in which a voltage of the data signal is not written sufficiently to a capacitance element, and thus deterioration in display quality due to the insufficient writing is likely to occur.

Figure 16:
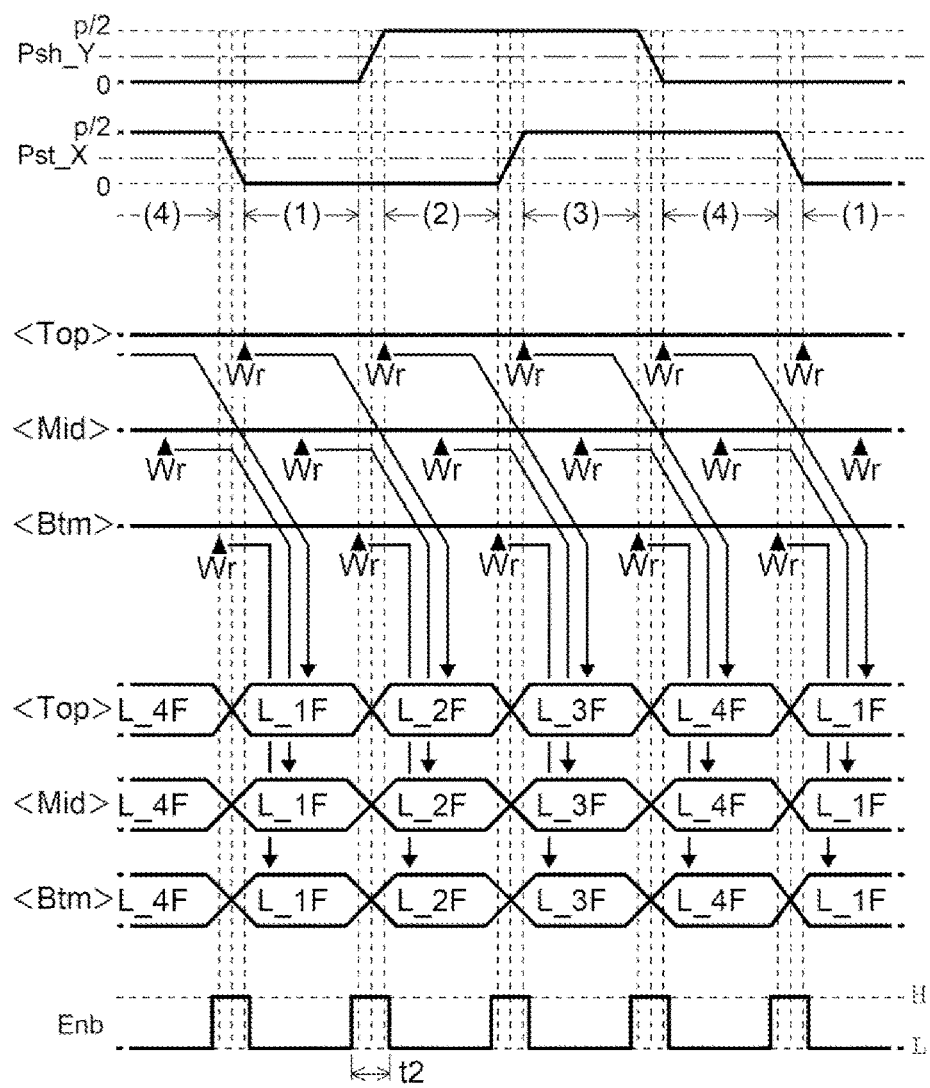
FIG. 16 is a diagram for explaining improvement of display quality by the exemplary embodiment.

FIG. 16 is a diagram for explaining that deterioration in display quality is suppressed in the first exemplary embodiment.

As described above, in the first exemplary embodiment, for example, in the writing sub-frame W_f1, data signals are sequentially written to the capacitance elements C1a for each horizontal scanning period H, while currents corresponding to voltages written to the capacitance elements C1b are simultaneously supplied to the OLEDs 130. In the next writing sub-frame W_f2, data signals are sequentially written to the capacitance elements C1b for each horizontal scanning period H, while currents corresponding to voltages written to the capacitance elements C1a are simultaneously supplied to the OLEDs 130.

Therefore, in the first exemplary embodiment, a time for writing the data signal is sufficiently ensured, and a discrepancy in display at a shifted position does not occur, thereby suppressing deterioration in display quality.

Second Exemplary Embodiment

Next, the projection device 1 according to a second exemplary embodiment will be described. The second exemplary embodiment is different from the first exemplary embodiment in a configuration of the pixel circuits 110R, 110G, and 110B in the display panel 10. Therefore, the second exemplary embodiment will be described mainly with respect to differences from the pixel circuits 110R, 110G, and 110B.

Note that, in the second exemplary embodiment, the pixel circuits 110R, 110G, and 110B each have a configuration in which a threshold voltage is compensated for the transistor 121 that controls a current flowing through the OLED 130.

Also, in the second exemplary embodiment, the electrical configuration of the pixel circuits 110R, 110G, and 110B is the same, and thus, description will be given with the pixel circuit 110R located in the i-th row and the (3j−2)-th column as a representative.

Figure 17:
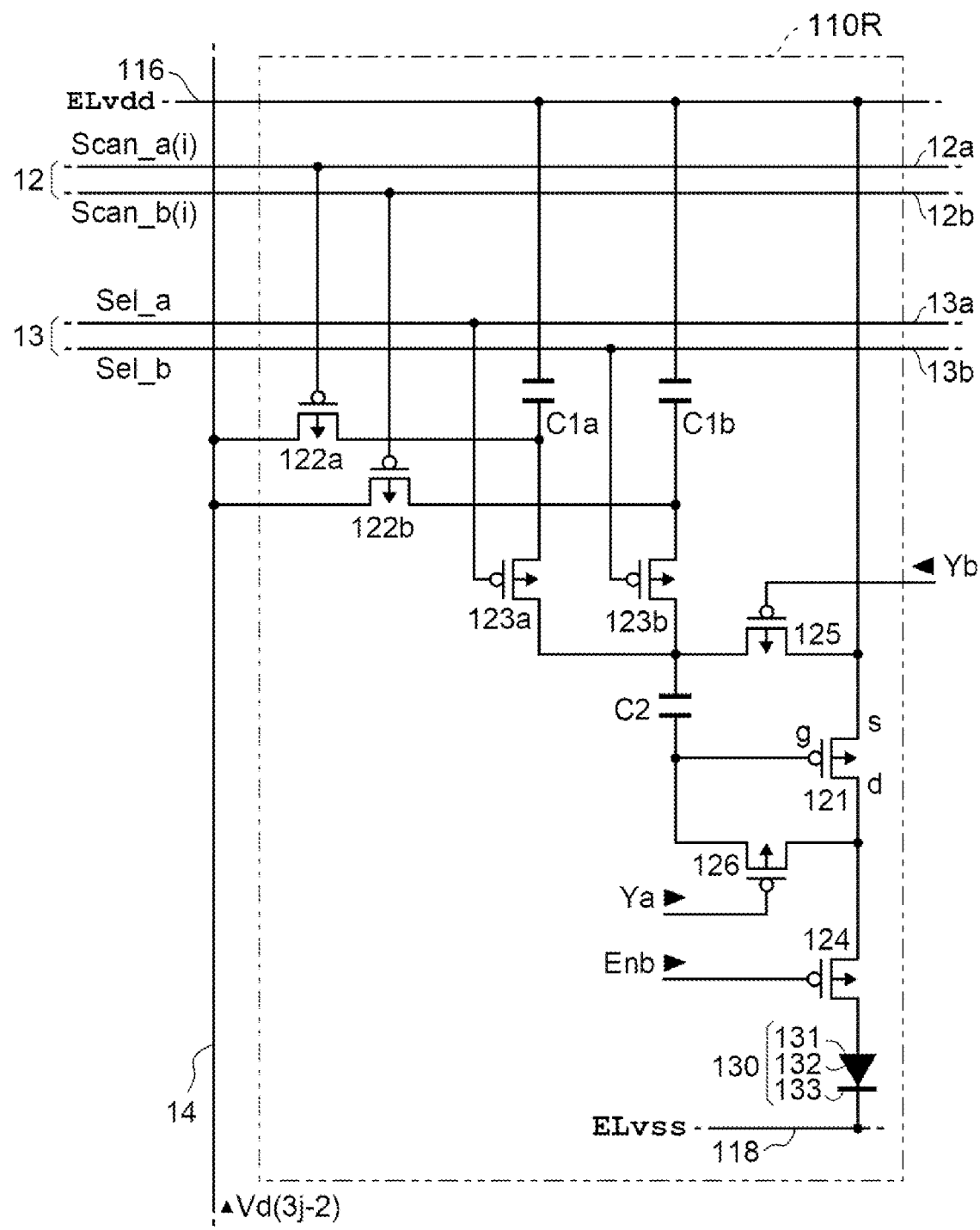
FIG. 17 is a diagram illustrating a pixel circuit of a display panel according to a second exemplary embodiment.

FIG. 17 is a circuit diagram illustrating an electrical configuration of the pixel circuit 110R in the display panel 10 of the projection device 1 according to the second exemplary embodiment. In the pixel circuit 110R illustrated in FIG. 17, a capacitance element C2 and p-channel MOS type transistors 125 and 126 are added, as compared to the pixel circuit 110R illustrated in FIG. 10.

In FIG. 17, the drain node of the transistor 123a and the drain node of the transistor 123b are connected to a drain node of the transistor 125 and one end of the capacitance element C2. Another end of the capacitance element C2 is connected to the gate node g of the transistor 121 and a drain node of the transistor 126. In the transistor 125, a source node is connected to the power supply wiring line 116, and a control signal Yb is supplied to a gate node. In the transistor 126, a source node is connected to the drain node d of the transistor 121, and a control signal Ya is supplied to a gate node.

Note that, the control signals Ya and Yb are commonly supplied to all of the pixel circuits 110R, 110G, and 110B from the control circuit 50.

Figure 18:
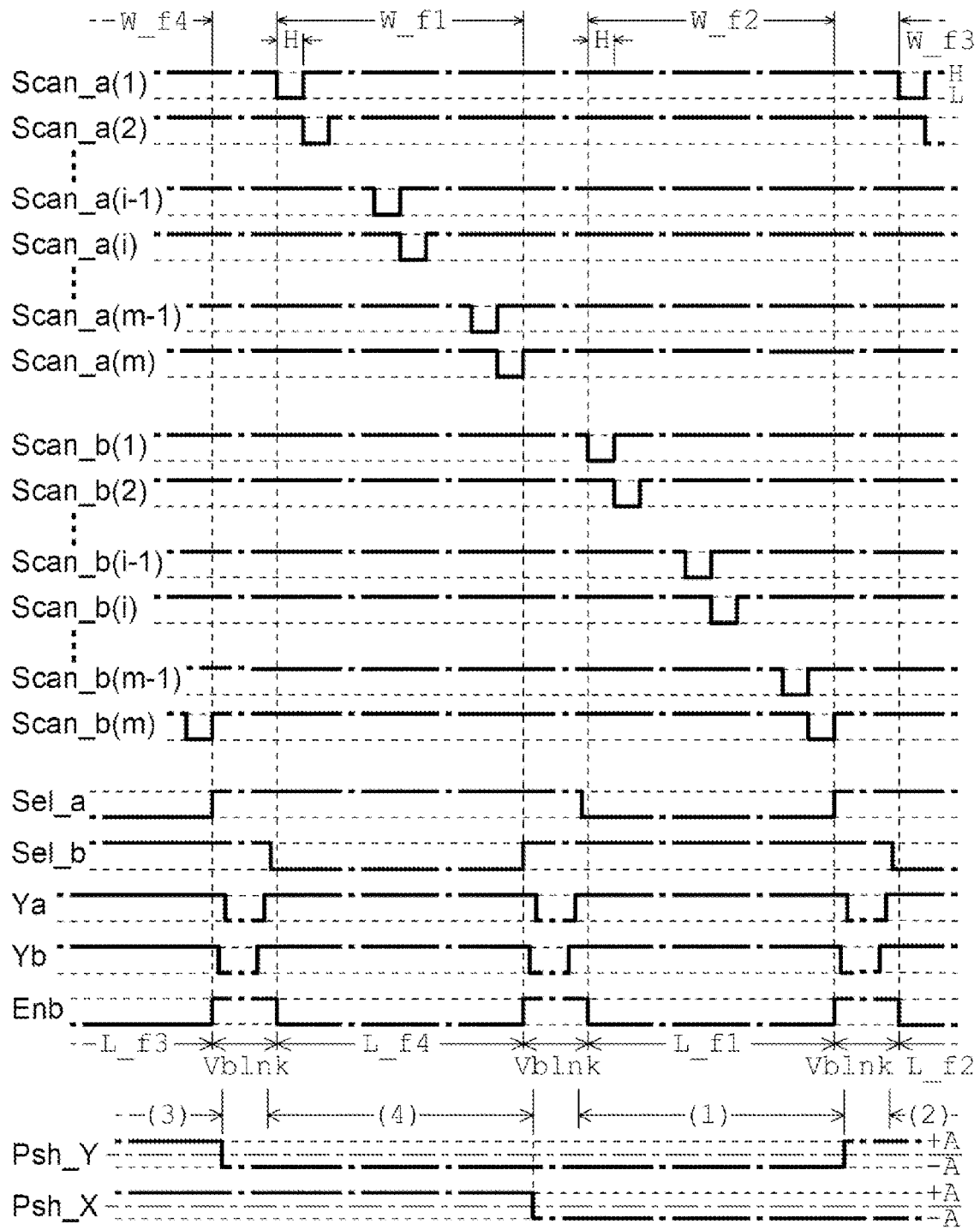
Figure 19:
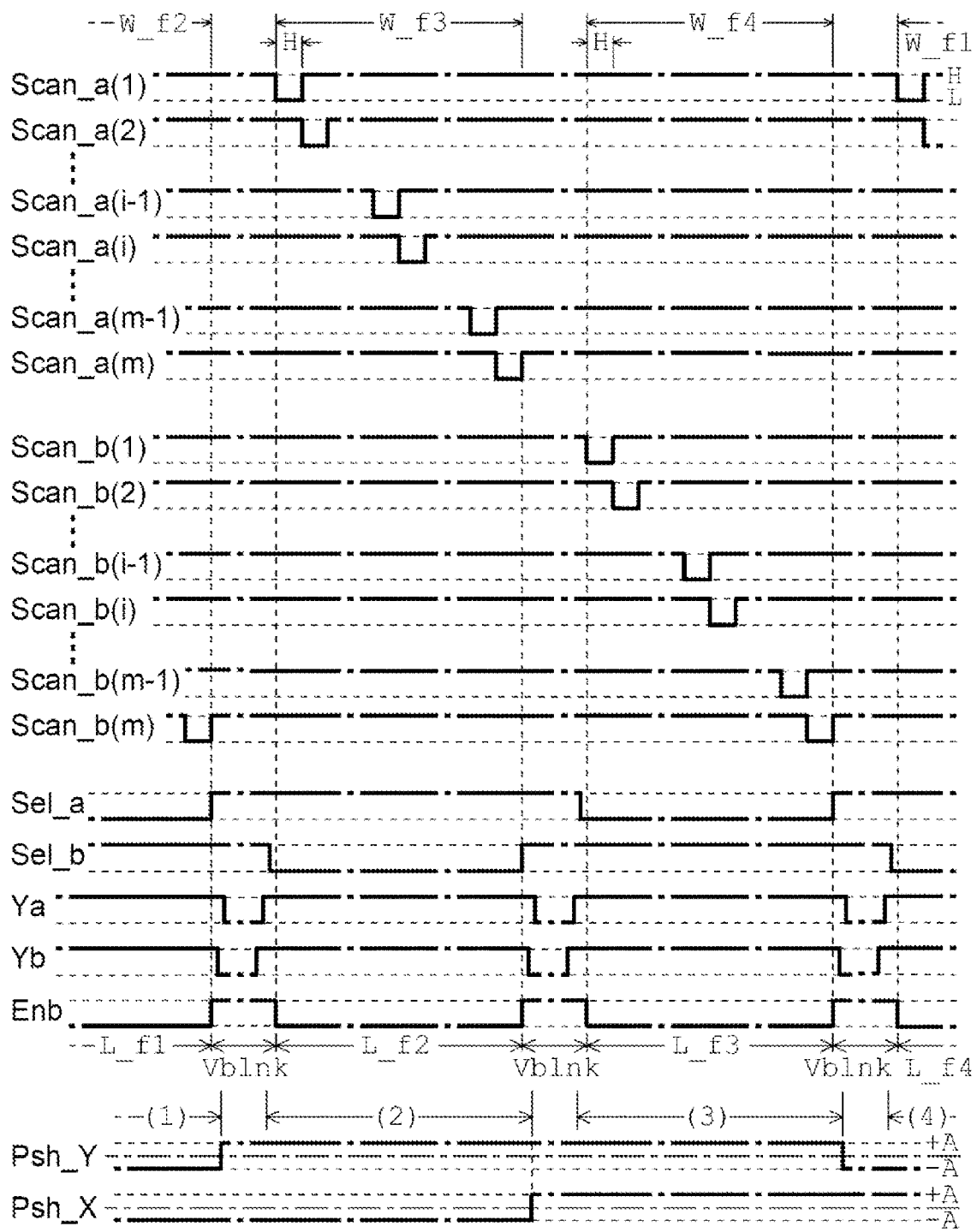

FIG. 18 and FIG. 19 are each a timing chart for explaining operation of the projection device 1 according to the second exemplary embodiment.

The control signals Ya and Yb are at the L level after each of the writing sub-frames W_f1 to W_f4 ends. In particular, after each of the writing sub-frames W_f1 to W_f4 ends, the control signal Yb is at the L level temporally earlier, and then the control signal Ya is at the L level. After the control signal Ya is at the L level, the control signal Yb is at the H level earlier, and then the control signal Ya is at the L level.

In addition, the second exemplary embodiment is similar to the first exemplary embodiment in that, in the writing sub-frames W_f1 and W_f3 (light-emitting sub-frames L_f4 and L_f2), the selection signal Sel_a is at the H level, the selection signal Sel_b is at the L level, and in the writing sub-frames W_f2 and W_f4 (light-emitting sub-frames L_f1 and L_f3), the selection signal Sel_a is at the L level, and the selection signal Sel_b is at the H level. However, timing at which each of the selection signals Sel_a and Sel_b changes to the H level is end timing of each of the writing sub-frames W_f1 to W_f4 (light-emitting sub-frames L_f1 to L_f4). Furthermore, timing at which each of the selection signals Sel_a and Sel_b changes to the L level is after the control signal Ya changes to the H level, and before the vertical scanning line flyback period Vblnk ends.

When the control signal Yb is at the L level at the end timing of each of the writing sub-frames W_f1 to W_f4, the transistor 125 is in the on state, so that one end of the capacitance element C2 has the power supply potential ELvdd.

Next, when the control signal Ya is at the L level, the transistor 126 is in the on state, and thus a state is generated in which the drain node and the gate node are connected in the transistor 121, that is, a diode-connected state. Thus, a voltage between the gate node g and the source node s in the transistor 121 is converged to a threshold voltage of the transistor 121, and the threshold voltage is held in the capacitance element C2.

When the control signal Yb is at the H level, the transistor 125 is in the off state, and when the control signal Ya is at the H level, the transistor 126 is in the off state.

The selection signal Sel_b is at the L level immediately before the vertical scanning line flyback period Vblnk ends, and the transistor 123b is in the on state, and thus the capacitance elements C1b and C2 are in a series state between the power supply wiring line 116 and the gate node g of the transistor 121.

Thus, in the light-emitting sub-frame L_f2 (or L_f4) after the end of the vertical scanning line flyback period Vblnk, a threshold voltage is added to a voltage corresponding to a gray scale level supplied in the previous writing sub-frame W_f2 (or W_f4), and the added voltage is applied to the gate node g of the transistor 121.

Additionally, after the end of the vertical scanning line flyback period Vblnk, when the light-emitting sub-frame L_f3 (or L_f1) is reached, the transistor 123a is in the on state, and thus the capacitance elements C1a and C2 are in the series state between the power supply wiring line 116 and the gate node g of the transistor 121. Therefore, in the light-emitting sub-frame L_f3 (or L_f1), a threshold voltage is added to a voltage corresponding to a gray scale level supplied in the previous writing sub-frame W_f3 (or W_f1), and the added voltage is applied to the gate node g of the transistor 121.

In this manner, according to the second exemplary embodiment, the threshold voltage of the transistor 121 is held in the capacitance element C2 in each vertical scanning line flyback period Vblnk.

In the subsequent light-emitting sub-frames, operation is performed in which, when the transistor 123b is in the on state, the threshold voltage (voltage held in the capacitance element C2) is added to the voltage (voltage held in the capacitance element C1b) corresponding to the gray scale level supplied in the previous writing sub-frame, while the added voltage is applied to the gate node g of the transistor 121, the voltage corresponding to the gray scale level is held in the capacitance element C1a when the transistor 122a is in the on state.

On the other hand, in the light-emitting sub-frames after the vertical scanning line flyback period Vblnk, operation is performed in which, when the transistor 123a is in the on state, the threshold voltage (voltage held in the capacitance element C2) is added to the voltage (voltage held in the capacitance element C1a) corresponding to the gray scale level supplied in the previous writing sub-frame, while the added voltage is applied to the gate node g of the transistor 121, the voltage corresponding to the gray scale level is held in the capacitance element C1b when the transistor 122b is in the on state.

In the second exemplary embodiment, such operation is repeated alternately.

The second exemplary embodiment is similar to the first exemplary embodiment in that, in the light-emitting sub-frames L_f1 to L_f4, in a state in which the position of the projection pixel is stable, the transistors 121 of all of the pixel circuits 110R, 110G, and 110B simultaneously cause currents to flow through the OLEDs 130.

Furthermore, according to the second exemplary embodiment, in any of the light-emitting sub-frames L_f1 to L_f4, in a state where the threshold voltage is compensated, the transistor 121 causes a current corresponding to a gray scale level to flow through the OLED 130, and thus high-quality display with less variation is possible for each of the pixel circuits 110R, 110G, and 110B.

Thus, in the second exemplary embodiment, a period of time for writing a data signal is sufficiently ensured, and there is no discrepancy in display at a shifted position, thus deterioration in display quality is suppressed, and high-quality display in which the threshold voltage is compensated is possible.

Figure 20:
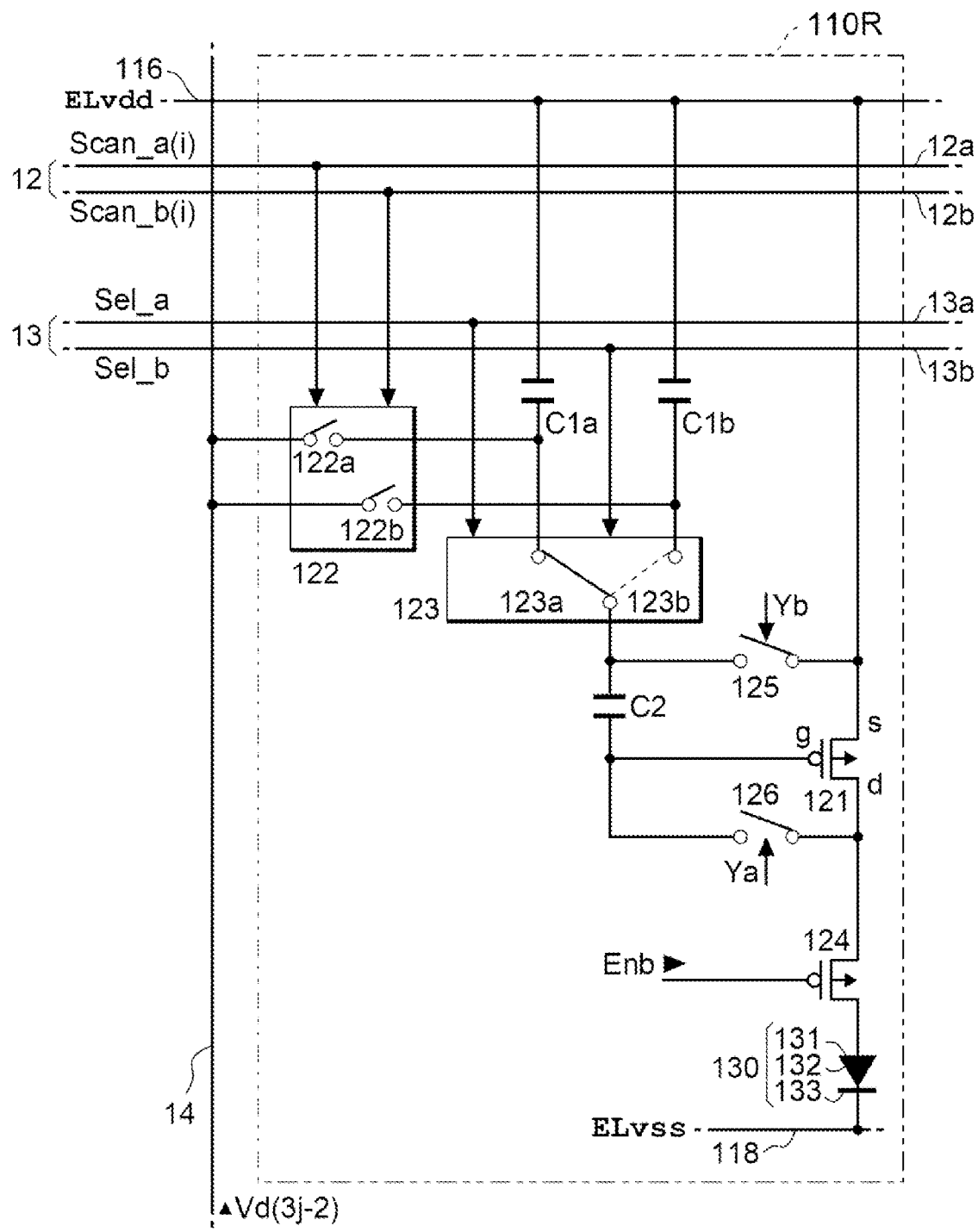
FIG. 20 is a diagram illustrating an equivalent circuit of the pixel circuit in the second exemplary embodiment.

It can be grasped that, the pixel circuits 110R, 110G, and 110B of the display panel 10 in the projection device 1 according to the second exemplary embodiment each have a configuration as illustrated in FIG. 20, for example, when the pixel circuit 110R is used as an example.

As illustrated in FIG. 15, the transistor 126 in FIG. 20 functions as a switching element that electrically short-circuits the gate node g and the drain node d of the transistor 121 when the control signal Ya is at the L level in the vertical scanning line flyback period Vblnk, to bring the transistor 121 into the diode-connected state. That is, the transistor 126 is an example of a sixth switching element.

Also, the capacitance element C2 holds the threshold voltage of the transistor 121 when the transistors 125 and 126 are in the on state. Then, the capacitance element C2, which holds the threshold voltage, is electrically interposed between the one end of the capacitance element C1b and the gate node g of the transistor 121 in the light-emitting sub-frame L_f2 (or L_f4) when the selection signal Sel_a is at the H level and the selection signal Sel_b is at the L level, and is electrically interposed between the one end of the capacitance element C1a and the gate node g of the transistor 121, in the light-emitting sub-frame L_f1 (or L_f3) when the selection signal Sel_a is at the L level and the selection signal Sel_b is at the H level. That is, the capacitance element C2 is an example of a third capacitance element.

Note that "electrically interposed" in the present description refers to being interposed among two or more elements, when viewed in terms of an electrical circuit.

APPLICATION EXAMPLE, MODIFICATION EXAMPLE

The first exemplary embodiment and the second exemplary embodiment exemplified above (hereinafter, referred to as the exemplary embodiments, and the like) can be variously modified. Specific modification aspects that may be applied to the exemplary embodiments are exemplified below. Two or more embodiments arbitrarily selected from the following examples may be combined to the extent that mutual contradiction does not arise.

The exemplary embodiments, and the like, have been configured such that, a period in which the scanning signals Scan_a(1) to Scan_a(m) are sequentially at the L level, and a period in which the scanning signals Scan_b(1) to Scan_b(m) are sequentially at the L level, that is, an entire region of a vertical effective scanning period is a light-emitting period, and the control signal Enb is set to the L level, that is, the OLED 130 is caused to emit light.

The present disclosure is not limited to this configuration, and a configuration may be adopted in which a light-emitting period in which the control signal Enb is at the L level is narrowed, and the light-emitting period of the OLED 130 is shortened. With such a configuration, when the light-emitting period of the OLED 130 is shortened, display characteristics in the display panel 10 approach a so-called impulse response, and thus impression of a residual image in video display is reduced. Also, a lower gray scale level can be further darkly represented in the pixel circuit 110.

Note that, when a part of a vertical effective scanning period is used as a light-emitting period, the light-emitting period may be temporally moved forward, may be temporally moved backward, or may be intermittent.

Figure 21:
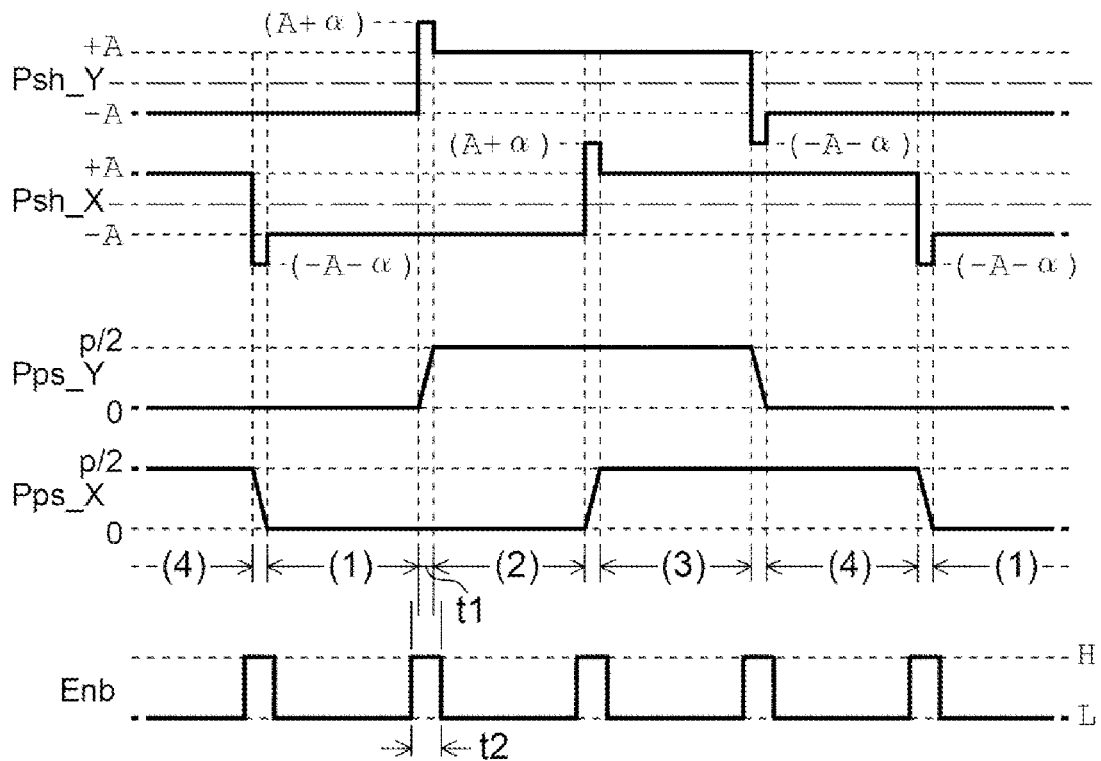
FIG. 21 is a timing chart illustrating control signals and the like to an optical path shifting element according to a modification example.

In order to increase responsiveness of optical path shifting, the optical path shifting element 20 may be overdriven. Specifically, as illustrated in FIG. 21, the video processing circuit 40, when changing a voltage of each of the control signals Psh_Y and Psh_X, sets a voltage that is excessively shifted in a direction of the change, and immediately after that, sets a voltage in accordance with a shift amount.

For example, when changing a projection pixel from the position (1) to the position (2), the video processing circuit 40 sets a voltage of the control signal Psh_Y to a voltage (A+α) that is excessively shifted by α in a direction of the change, and immediately after that, sets the voltage +A. Further, for example, when changing a projection pixel from the position (4) to the position (1), the video processing circuit 40 sets the voltage of the control signal Psh_X to a voltage (−A−α) that is excessively shifted by α in a direction of the change, and immediately after that, sets the voltage −A.

When the optical path shifting element 20 is overdriven in this manner, responsiveness of the optical path shifting is increased, and thus a period in which the projection pixel is stable at any of the positions (1) to (4) increases. Therefore, it is possible to secure a long period of the light-emitting sub-frames L_f1 to L_f4.

In the exemplary embodiments, and the like, the optical path shifting element 20 is configured to shift a projection pixel in the direction along each of the two axes of X and Y, but may be configured to shift a projection pixel in a direction along one axis of either X or Y. For example, when a configuration is adopted in which, when a projection pixel is shifted to two different positions in a direction along the X-axis, resolution of the display panel 10 is increased to be horizontally doubled in a pseudo manner, and is visually recognized. Additionally, a configuration may be adopted for shifting an optical path in an oblique direction, not along the X-axis or the Y-axis.

In the display panel 10 according to the exemplary embodiments, and the like, the transistor 124 is provided between the transistor 121 and the OLED 130, but the position where the transistor 124 is provided is not limited to the above gap. Since the transistor 124 functions to block a path through which a current controlled by the transistor 121 flows through the OLED 130, it is sufficient to adopt a configuration in which the transistors 121 and 124 are connected in series between the power supply wiring lines 116 and 118. Note that, the transistor 124 is an example of a fifth switching element.

Additionally, in the display panel 10, the configuration has been described in which the transistor 124 is provided in each of the pixel circuits 110R, 110G, and 110B, and the transistor 121 causes a current to flow through the OLED 130 by the transistor 124 being in the on state, but in the first exemplary embodiment, since a light-emitting period is common to all of the OLEDs 130, a configuration may be adopted in which, for example, a power supply circuit (not illustrated) supplies the power supply potential ELvdd to be supplied to the power supply wiring line 116 in accordance with the light-emitting period.

The projection device 1 according to the exemplary embodiments, and the like represents one color pixel with additive color mixing by the sub-panel pixels 11R, 11G, and 11B, and thus the display panel 10 is single plate type, but may be three-plate type in which a display panel that creates a red image, a display panel that creates a green image, and a display panel that creates a blue image are combined by a dichroic prism, and projection is performed.

In addition, in the exemplary embodiments, and the like, the OLED 130 is illustrated and described as an example of the light-emitting element, but other light-emitting elements may be used. For example, an LED (Light Emitting Diode), a mini LED, a micro LED, or the like may be used as the light-emitting element.

The channel types of transistors 121, 122a, 122b, 123a, 123b, 124, 125, and 126 are not limited to the exemplary embodiments, and the like. Further, these transistors may also be replaced with transmission gates as appropriate except for the transistor 121.

SUPPLEMENTARY NOTE

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

Appendix 1

A projection device (1) according to an aspect (Aspect 1) includes a display panel (10) including a plurality of pixel circuits (110R, 110G, 110B), and an optical path shifting element (20), wherein each of the plurality of pixel circuits (110R, 110G, 110B) includes a first capacitance element (C1a) and a second capacitance element (C1b), and a light-emitting element (130) that emits light, having luminance corresponding to a current, in a predetermined direction, the optical path shifting element (20) is capable of shifting an optical path of light emitted from the light-emitting element (130) to a first optical path and a second optical path, in the plurality of pixel circuits (110R, 110G, 110B), in a first period (W_f1), a voltage corresponding to a current supplied to the light-emitting element (130) is held in the first capacitance element (C1a), in a light-out period (Vblnk) after the first period (W_f1), the light-emitting element (130) is off, in a second period (W_f2) after the light-out period (Vblnk), a current corresponding to the voltage held in the first capacitance element (C1a) is supplied to the light-emitting element (130), and a voltage corresponding to the current supplied to the light-emitting element (130) is held in the second capacitance element (C1b), and in the optical path shifting element (20), an optical path is shifted from a first optical path to a second optical path in the light-out period (Vblnk), and the optical path is maintained to be the second optical path in the second period (W_f2).

According to Aspect 1, a time for writing the voltage corresponding to the current supplied to the light-emitting element (130) in the first period (W_f1) is sufficiently ensured, and in the second period (W_f2), while the optical path is maintained, the current corresponding to the voltage held is supplied to the light-emitting element (130), and thus a discrepancy in display at a shifted position does not occur.

Note that, the writing sub-frame W_f1 is an example of the first period, and a vertical scanning line flyback period is an example of the light-out period (Vblnk), and the writing sub-frame W_f2 is an example of the second period.

Appendix 2

In the projection device (1) according to a specific aspect of Aspect 1 (Aspect 2), a current corresponding to a voltage held in the second capacitance element (C1b) is supplied to the light-emitting element (130) in the first period (W_f1), and the first optical path is maintained. According to Aspect 1, the voltage corresponding to the current supplied to the light-emitting element (130) is alternately retained in the first capacitance element (C1a) and the second capacitance element (C1b).

Appendix 3

In the projection device (1) according to a specific aspect of Aspect 2 (Aspect 3), one pixel circuit (for example, 110R), among the plurality of pixel circuits (110R, 110G, 110B), is provided corresponding to an intersection of a data line (14) and a scanning line (12), and further includes a first selector (122), a second selector (123), and a driving transistor (121), the driving transistor (121) is capable of supplying a current corresponding to a voltage of a gate node to the light-emitting element (130), in the first period (W_f1), the first selector (122) electrically connects one end of the first capacitance element (C1a) to the data line (14) when the scanning line (12) is selected, the second selector (123) electrically connects one end of the second capacitance element (C1b) to the gate node, in the second period (W_f1), the first selector (122) electrically connects the one end of the second capacitance element (C1b) to the data line (14) when the scanning line (12) is selected, and the second selector (123) electrically connects the one end of the first capacitance element (C1b) to the gate node. According to Aspect 3, by the first selector (122), the voltage corresponding to the current is held in one of the first capacitance element (C1a) and the second capacitance element (C1b), and by the second selector (123), a voltage held in another of the first capacitance element (C1a) and the second capacitance element is applied to the gate node and a source node of the driving transistor (121).

Appendix 4

In the projection device (1) according to a specific aspect of Aspect 3 (Aspect 4), the first selector (122) includes a first switching element (122a) that is in an on state or an off state between the data line (14) and the one end of the first capacitance element (C1a), and a second switching element (122b) that is in the on state or the off state between the data line (14) and the one end of the second capacitance element (C2b), and the second selector (123) includes a third switching element (123a) that is in the on state or the off state between the one end of the first capacitance element (C1b) and the gate node, and a fourth switching element (123b) that is in the on state or the off state between the one end of the second capacitance element (C1b) and the gate node. According to Aspect 4, the first selector (122) and the second selector (123) can be specifically configured.

Appendix 5

In the projection device (1) according to a specific aspect of Aspect 4 (Aspect 5), the one pixel circuit (110R) includes a fifth switching element (124) connected in series to the driving transistor (121) between a high level power supply wiring line (116) and a low level power supply wiring line (118).

According to Aspect 5, the driving transistor (121) can supply a current corresponding to a potential of a gate node (g) to the light-emitting element (130) by the on state of the fifth switching element (124).

Appendix 6

In the projection device (1) according to a specific aspect of Aspect 5 (Aspect 6), the fifth switching element (124) is in the on state in all or a part of the first period (W_f1) or the second period (W_f2). According to Aspect 6, it is possible to control a period in which a current flows through the light-emitting element (130). Specifically, by increasing the period, brightness of a display image can be ensured, and by decreasing the period, impression of a blur of video display can be reduced.

Appendix 7

In the projection device (1) according to a specific aspect of Aspect 3, 4, 5 or 6 (Aspect 7), the one pixel circuit (110R) includes a sixth switching element (126) that brings the driving transistor (121) into a diode-connected state. According to Aspect 7, a threshold voltage of the driving transistor (121) can be determined by the diode-connected state of the driving transistor (121).

Appendix 8

In the projection device (1) according to a specific aspect of Aspect 7 (Aspect 8), the one pixel circuit (110R) includes a third capacitance element (C2) in which the threshold voltage of the driving transistor (121) is held, and the third capacitance element (C2) is interposed between the one end of the second capacitance element (C1b) and the gate node in the first period (W_f1), and is interposed between the one end of the second capacitance element (C1b) and the gate node in the second period (W_f2). According to Aspect 8, the threshold voltage of the driving transistor (121) can be compensated.

Appendix 9

The projection device (1) according to any one of Aspects 1 to 8 can be conceived as Aspect (9) of a method for controlling the projection device (1). Specifically, a method for controlling the projection device (1) according to Aspect 9 is a method for controlling the projection device (1) that includes the display panel (10) including the plurality of pixel circuits (110R, 110G, 110B), and the optical path shifting element (20), wherein each of the plurality of pixel circuits (110R, 110G, 110B) includes the first capacitance element (C1a) and the second capacitance element (C1b), and the light-emitting element (130) that emits light, having luminance corresponding to a current, in a predetermined direction, the optical path shifting element (20) is capable of shifting an optical path of light emitted from the light-emitting element to a first optical path and a second optical path, in the first period (W_f1), a voltage corresponding to a current supplied to the light-emitting element (130) is held in the first capacitance element (C1a), in the light-out period (Vblnk) after the first period (W_f1), the light-emitting element (130) is off, the optical path is shifted from the first optical path to the second optical path, in the second period (W_f2) after the light-out period (Vblnk), a current corresponding to the voltage held in the first capacitance element (C1a) is supplied to the light-emitting element (130), and a voltage corresponding to the current supplied to the light-emitting element (130) is held in the second capacitance element (C1b), and the second optical path is maintained.

What is claimed is:

1. A projection device, comprising:
a display panel including a pixel circuit including a first capacitance element and a second capacitance element, and a light-emitting element that emits light, having luminance corresponding to a current, in a predetermined direction, wherein in a first period, a voltage corresponding to a current supplied to the light-emitting element is held in the first capacitance element, in a light-out period after the first period, the light-emitting element is off, in a second period after the light-out period, a current corresponding to the voltage held in the first capacitance element is supplied to the light-emitting element, and a voltage corresponding to the current supplied to the light-emitting element is held in the second capacitance element; and
an optical path shifting element configured to shift an optical path of light emitted from the light-emitting element to a first and second optical paths, wherein shifting is performed from the first optical path to the second optical path in the light-out period, and the second optical path is maintained in the second period.

2. The projection device according to claim 1, wherein in the first period,
a current corresponding to the voltage held in the second capacitance element is supplied to the light-emitting element, and
the first optical path is maintained.

3. The projection device according to claim 2, wherein the pixel circuit is
provided corresponding to an intersection of a data line and a scanning line, and
further includes a first selector, a second selector, and a driving transistor,
the driving transistor is configured to supply a current corresponding to a voltage of a gate node to the light-emitting element,
in the first period,
the first selector electrically connects one end of the first capacitance element to the data line when the scanning line is selected,
the second selector electrically connects one end of the second capacitance element to the gate node,
in the second period,
the first selector electrically connects the one end of the second capacitance element to the data line when the scanning line is selected, and
the second selector electrically connects the one end of the first capacitance element to the gate node.

4. The projection device according to claim 3, wherein the first selector includes
a first switching element that is in an on state or an off state between the data line and the one end of the first capacitance element, and
a second switching element that is in the on state or the off state between the data line and the one end of the second capacitance element, and
the second selector includes
a third switching element that is in the on state or the off state between the one end of the first capacitance element and the gate node, and
a fourth switching element that is in the on state or the off state between the one end of the second capacitance element and the gate node.

5. The projection device according to claim 4, wherein the pixel circuit includes
a fifth switching element connected in series to the driving transistor between a high level power supply wiring line and a low level power supply wiring line.

6. The projection device according to claim 5, wherein in all or a part of the first period or the second period, the fifth switching element is in the on state.

7. The projection device according to claim 3, wherein the pixel circuit includes
a sixth switching element that brings the driving transistor into a diode-connected state.

8. The projection device according to claim 7, wherein the pixel circuit includes
a third capacitance element in which a threshold voltage of the driving transistor is held, and the third capacitance element
is interposed between the one end of second capacitance element and the gate node
in the first period and
is interposed between the one end of the second capacitance element and the gate node in the second period.

9. A method for controlling a projection device including
a display panel including a pixel circuit including a first capacitance element and a second capacitance element, and a light-emitting element that emits light, having luminance corresponding to a current, in a predetermined direction, and
an optical path shifting element configured to shift an optical path of light emitted from the light-emitting element to a first optical path and a second optical path, wherein
in a first period,
a voltage corresponding to a current supplied to the light-emitting element is held in the first capacitance element,
in a light-out period after the first period,
the light-emitting element is off, and
the optical path is shifted from the first optical path to the second optical path,
in a second period after the light-out period,
a current corresponding to the voltage held in the first capacitance element is supplied to the light-emitting element,
a voltage corresponding to the current supplied to the light-emitting element is held in the second capacitance element, and
the second optical path is maintained.

* * * * *